US011373351B2

(12) United States Patent
Tachikawa

(10) Patent No.: US 11,373,351 B2
(45) Date of Patent: Jun. 28, 2022

(54) IMAGE PROCESSING METHOD, PROGRAM, AND IMAGE PROCESSING SYSTEM

(71) Applicant: FUJIFILM Corporation, Tokyo (JP)

(72) Inventor: Kimiko Tachikawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/828,701

(22) Filed: Mar. 24, 2020

(65) Prior Publication Data
US 2020/0311999 A1 Oct. 1, 2020

(30) Foreign Application Priority Data

Mar. 26, 2019 (JP) .............................. JP2019-058896

(51) Int. Cl.
*G06F 3/048* (2013.01)
*G06T 11/60* (2006.01)
*G06F 40/106* (2020.01)

(52) U.S. Cl.
CPC ............ *G06T 11/60* (2013.01); *G06F 40/106* (2020.01)

(58) Field of Classification Search
CPC ................................ G06T 11/60; G06F 40/106
See application file for complete search history.

(56) References Cited

U.S. PATENT DOCUMENTS

| | | | |
|---|---|---|---|
| 5,701,497 A | 12/1997 | Yamauchi et al. | |
| 10,706,889 B2 * | 7/2020 | Thomee | G06K 9/46 |
| 10,713,794 B1 * | 7/2020 | He | G06N 3/0454 |
| 10,740,647 B2 * | 8/2020 | Du | G06N 3/04 |
| 11,037,015 B2 * | 6/2021 | Elharrar | G06K 9/4604 |
| 11,138,766 B2 * | 10/2021 | Nojiri | G06T 7/90 |
| 11,256,913 B2 * | 2/2022 | Tagra | G06V 30/416 |
| 2002/0051575 A1 | 5/2002 | Myers et al. | |

(Continued)

FOREIGN PATENT DOCUMENTS

| JP | H04-024758 A | 1/1992 |
|---|---|---|
| JP | H11-219366 A | 8/1999 |

(Continued)

OTHER PUBLICATIONS

An Office Action mailed by the United States Patent and Trademark Office dated Feb. 9, 2022, which corresponds to U.S. Appl. No. 16/828,701 and is related to U.S. Appl. No. 16/828,701.

(Continued)

*Primary Examiner* — David Phantana-angkool
(74) *Attorney, Agent, or Firm* — Studebaker & Brackett PC

(57) ABSTRACT

An image processing method, a program, and an image processing system for enjoying an image and kanji as a whole are provided.
An image processing method includes an image analysis step of analyzing an acquired image and extracting an object from the image, a kanji string decision step of deciding a kanji string that includes one or more kanji characters related to the object, a layout decision step of deciding a layout in which the kanji string is composited with the image, and a composition step of generating a composite image by compositing the kanji string with the image based on the layout, in which in the layout decision step, a layout in which the object is set as a foreground of the composite image and the kanji string is set as a background of the composite image is decided.

21 Claims, 15 Drawing Sheets

(56) References Cited

U.S. PATENT DOCUMENTS

| | | |
|---|---|---|
| 2003/0120478 A1 | 6/2003 | Palmquist |
| 2003/0200078 A1 | 10/2003 | Luo et al. |
| 2004/0260535 A1 | 12/2004 | Chen et al. |
| 2005/0114145 A1 | 5/2005 | Janakiraman et al. |
| 2009/0296124 A1 | 12/2009 | Ohguro |
| 2010/0026706 A1* | 2/2010 | Yamaji ............... H04N 1/00129 345/594 |
| 2011/0211815 A1 | 9/2011 | Yamashita et al. |
| 2014/0081620 A1 | 3/2014 | Solntseva |
| 2014/0172408 A1 | 6/2014 | Vukosavljevic et al. |
| 2016/0085994 A1 | 3/2016 | Pereira |
| 2016/0328394 A1 | 11/2016 | Cuthbert et al. |
| 2016/0342863 A1* | 11/2016 | Kwon ..................... G06F 16/51 |
| 2019/0156162 A1 | 5/2019 | King et al. |
| 2019/0354609 A1* | 11/2019 | Huang .................. G06F 16/583 |
| 2020/0019295 A1* | 1/2020 | Spivack ................ G06F 3/1454 |
| 2020/0026766 A1 | 1/2020 | Ji et al. |
| 2020/0090375 A1* | 3/2020 | Mori ....................... G06F 16/53 |
| 2020/0301950 A1* | 9/2020 | Lorrain-Hale ........ G06F 3/0482 |
| 2020/0311998 A1* | 10/2020 | Tachikawa ........... G06K 9/4652 |
| 2020/0311999 A1 | 10/2020 | Tachikawa |
| 2020/0356590 A1* | 11/2020 | Clarke .................. G06F 16/447 |
| 2021/0027448 A1* | 1/2021 | Cohen ....................... G06T 7/90 |
| 2021/0027471 A1* | 1/2021 | Cohen .................. G06K 9/4642 |
| 2021/0303836 A1* | 9/2021 | Kasatani ............... G06F 3/0482 |
| 2021/0390364 A1* | 12/2021 | Marggraff ........ H04N 21/44218 |
| 2021/0397876 A1* | 12/2021 | Hemani .................. G06K 9/629 |
| 2022/0057931 A1* | 2/2022 | Zhu ..................... G06F 3/04883 |

FOREIGN PATENT DOCUMENTS

| | | |
|---|---|---|
| JP | 2012-079076 A | 4/2012 |
| JP | 5341946 B2 | 11/2013 |
| JP | 5545507 B2 | 7/2014 |
| JP | 5574031 B2 | 8/2014 |
| JP | 2016-535335 A | 11/2016 |
| JP | 6063536 B2 | 1/2017 |
| JP | 6232662 B2 | 11/2017 |
| JP | 2018-151829 A | 9/2018 |
| JP | 2020-160745 A | 10/2020 |
| WO | 2015/069737 A2 | 5/2015 |

OTHER PUBLICATIONS

An Office Action; "Notice of Reasons for Refusal", mailed by the Japanese Patent Office dated Dec. 2, 2021, which corresponds to Japanese Patent Application No. 2019-058895 and is related to U.S. Appl. No. 16/828,701; with English language translation.

An Office Action issued by the United States Patent and Trademark Office dated Jun. 30, 2021, which corresponds to U.S. Appl. No. 16/828,701 and is related to U.S. Appl. No. 16/828,701.

Advisory Action issued by the U.S. Patent and Trademark Office dated May 16, 2022, which corresponds to U.S. Appl. No. 16/828,586.

* cited by examiner

| OBJECT ATTRIBUTE INFORMATION | KANJI (44) | HASHTAG (46) |
|---|---|---|
| EMPTINESS | 空 | #emptiness |
| | | #sky |
| | 天 | #heaven |
| | | #sky |
| SHRINE BUILDING | 神 | #god |
| | | #shrine |
| | 魂 | #soul |
| | 寺 | #temple |
| | 神 | #god |
| | | #shrine |
| HIGH-RISE TOWER | 塔 | #tower |
| | 高 | #high |
| SMILING FACE | 笑 | #smile |
| | 寿 | #lucky |
| | 福 | #happy |
| RAMEN | 麺 | #ramen |
| | | #noodle |
| GOLDFISH | 魚 | #fish |
| | 金魚 | #goldfish |
| CAT ORNAMENT | 猫 | #cat |
| | | #ornament |

IMAGE PROCESSING METHOD, PROGRAM, AND IMAGE PROCESSING SYSTEM

CROSS-REFERENCE TO RELATED APPLICATIONS

The present application claims priority under 35 U.S.C. § 119 to Japanese Patent Application No. 2019-058896, filed on Mar. 26, 2019. The above application is hereby expressly incorporated by reference, in its entirety, into the present application.

BACKGROUND OF THE INVENTION

1. Field of the Invention

The present invention relates to an image processing method, a program, and an image processing system and particularly, to a content for enjoying kanji.

2. Description of the Related Art

Kanji is unusual for foreigners who visit Japan and particularly do not usually use kanji. Kanji may be provided on products such as clothing and postcards as a target of appreciation. In addition, electronic contents in which kanji is composited are loved and purchased by foreigners.

Examples of a way of making foreigners enjoy kanji include creation of a seal in which kanji in Japanese and alphabets are used on a seal surface, creation of a kanji name by arranging one or more corresponding phonetically equivalent characters in correspondence with pronunciation of a foreign name, and the like are exemplified. However, in any of the examples, an original text is translated, or kanji itself presented to foreigners is individually considered by Japanese people.

JP5545507B discloses a seal creation apparatus that processes a sample image in which a user is captured as a subject. In JP5545507B, a composite image that is generated by setting the sample image as a foreground and setting a composition image as a background is disclosed.

JP6232662B discloses a photograph imaging game machine that generates a composite image in which a photograph image and a plurality of editing images are composited. In JP6232662B, the composite image that is generated by setting the photograph image as a foreground and setting the editing images as a background is disclosed.

JP5574031B discloses a composite image in which a semi-transparent foreground image in which a character is displayed on the entire image is superimposed on a captured image.

SUMMARY OF THE INVENTION

However, contents for making foreign tourists and the like visiting Japan conveniently enjoy kanji are not present. In addition, while JP5545507B, JP6232662B, and JP5574031B disclose the composite image generated by compositing the captured image and the composition image or the like, the composite image is simply enjoyed by randomly selecting a combination of the captured image and the composition image or the like in any of JP5545507B, JP6232662B, and JP5574031B, and the image and kanji are not enjoyed as a whole.

The present invention is conceived in view of the above matter. An object of the present invention is to provide an image processing method, a program, and an image processing system for enjoying an image and kanji as a whole.

In order to achieve the object, the following aspects of the invention are provided.

An image processing method according to a first aspect is an image processing method comprising an image analysis step of analyzing an image and extracting an object from the image, a kanji string decision step of deciding a kanji string that includes one or more kanji characters related to the object, a layout decision step of deciding a layout in which the kanji string is composited with the image as a decided layout, and a composition step of generating a composite image by compositing the kanji string with the image based on the decided layout, in which in the layout decision step, a layout in which the object is set as a foreground of the composite image and the kanji string is set as a background of the composite image is decided as the decided layout.

According to the first aspect, the kanji string related to the object included in the acquired image is extracted, and the kanji string is composited with the image by setting the object as a foreground and setting the kanji string as a background. Accordingly, the kanji string can be composited with the image including the object without degrading visibility of the object, and the image and the kanji can be enjoyed as a whole.

A subject such as a person, a natural structure, and a building in the image may be applied to the object included in the image. A background such as emptiness and a scene in the image may be applied to the object. In the image analysis step, one object may be extracted from a plurality of objects, or two or more objects may be extracted.

Kanji used in the Japanese language may be applied to the kanji. Kanji used in a foreign country such as China may be applied to the kanji.

Examples of the kanji string related to the object include a kanji string that represents details of the object, a kanji string that represents an image of the object, a kanji string that is imaginable from the object, and the like.

The layout may include information of a position of the object. The layout may include information of a position of the kanji string in the image. a color of the kanji string, a font of the kanji string, and the like.

Coordinate values in the image may be applied to the information of the position of the object, the information of the position of the kanji string, and the information of the position of the alphabet character string.

A second aspect may be configured such that in the image processing method of the first aspect, in the layout decision step, a layout in which an outline character is applied to the kanji string is decided as the decided layout.

According to the second aspect, the composite image in which both of the object and the kanji string are highlighted and excellent design quality is obtained in the composite image may be generated.

An aspect in which a character region is transparent may be employed as the outline character. In such an aspect, a non-object that is a background of the kanji string in the composite image excluding the object in the image may be visually recognized.

A third aspect may be configured such that in the image processing method of the second aspect, in the layout decision step, a layout in which semi-transparency is applied to a background of the outline character is decided as the decided layout.

According to the third aspect, in the composite image, the non-object excluding the object in the image from which the object is extracted may be visually recognized.

A fourth aspect may be configured such that in the image processing method of the second aspect or the third aspect, in the layout decision step, a layout in which at least a part of a non-object excluding the object in the image is seen through the kanji string to which the outline character is applied is decided as the decided layout.

According to the fourth aspect, the entire composite image may be visually recognized.

A fifth aspect may be configured such that in the image processing method of any one aspect of the second aspect to the fourth aspect, in the layout decision step, a layout in which a part of the outline character is superimposed on a background of the outline character is decided as the decided layout.

According to the fifth aspect, the object is highlighted in the composite image.

A sixth aspect may be configured such that in the image processing method of any one aspect of the first aspect to the fifth aspect, in the layout decision step, a layout in which the kanji string is arranged away from a subject of the image is decided as the decided layout.

According to the sixth aspect, visibility of the subject in the composite image may be secured. Further, a layout in which the kanji string is arranged away from the object of the image may be decided as the decided layout in the layout decision step. That is, the subject may be the object. Moreover, the subject may be an object (another object) other than the object included in the image. Furthermore, the subject or the object may include an animal, a building and so on, as well as at least one person.

The subject of the image is a region that is focused in the image. For example, an example of the subject is a person. The subject may be the object or the non-object.

A seventh aspect may be configured such that in the image processing method of any one aspect of the first aspect to the fifth aspect, in the layout decision step, a layout in which the kanji string is superimposed on a subject of the image is decided as the decided layout.

According to the seventh aspect, the kanji string may be highlighted in the composite image. Further, a layout in which the kanji string is superimposed on the object of the image may be decided as the decided layout in the layout decision step. That is, the subject may be the object. Moreover, the subject may be an object (another object) other than the object included in the image. Furthermore, the subject or the object may include an animal, a building and so on, as well as at least one person.

An eighth aspect may be configured such that the image processing method of any one aspect of the first aspect to the seventh aspect further comprises a printing step of printing the composite image using a printing apparatus (printer).

According to the eighth aspect, a printed material on which the composite image is printed may be provided. Accordingly, the kanji can be enjoyed using the printed material.

A ninth aspect may be configured such that the image processing method of any one aspect of the first aspect to the eighth aspect further comprises an alphabet character string decision step of deciding an alphabet character string related to a meaning of the kanji string, in which in the layout decision step, a layout in which the alphabet character string is composited with the image is decided as the decided layout.

According to the ninth aspect, foreigners and the like who have difficulty in understanding the meaning of the kanji string may understand the meaning of the kanji string. Accordingly, foreigners and the like who have difficulty in understanding the meaning of the kanji string can enjoy the kanji. Here, in the composition step, the composite image may be generated by compositing the kanji string and the alphabet character string with the image based on the decided layout.

A foreign word such as an English word that represents the meaning of the kanji string may be applied to the alphabet character string. The alphabet character string may include a specific sign and the like such as a hashtag.

Examples of the alphabet character string related to the kanji string include an alphabet character string that represents the meaning of the kanji string, an alphabet character string that represents an image of the kanji string, an alphabet character string that is imaginable from the kanji string, and the like.

The layout may include information of a position of the alphabet character string in the image, a color of the alphabet character string, a font of the alphabet character string, and the like.

A tenth aspect may be configured such that in the image processing method of the ninth aspect, in the layout decision step, a layout in which an outline character is applied to the alphabet character string is decided as the decided layout.

According to the tenth aspect, in the composite image, the alphabet character string is highlighted in the same manner as the kanji string. In addition, in the composite image, integrity between the alphabet character string and the kanji string is obtained.

An eleventh aspect may be configured such that in the image processing method of the tenth aspect, in the layout decision step, a layout in which semi-transparency is applied to a background of the outline character is decided as the decided layout.

According to the eleventh aspect, in the composite image, the non-object excluding the object in the image from which the object is extracted may be visually recognized.

A twelfth aspect may be configured such that in the image processing method of the tenth aspect or the eleventh aspect, in the layout decision step, a layout in which at least a part of a non-object excluding the object in the image is seen through the alphabet character string to which the outline character is applied is decided as the decided layout.

According to the twelfth aspect, the entire composite image may be visually recognized.

A program according to a thirteenth aspect is a program causing a computer to implement an image analysis function of analyzing an image and extracting an object from the image, a kanji string decision function of deciding a kanji string that includes one or more kanji characters related to the object, a layout decision function of deciding a layout in which the kanji string is composited with the image as a decided layout, and a composition function of generating a composite image by compositing the kanji string with the image based on the layout, in which the layout decision function decides a layout in which the object is set as a foreground of the composite image and the kanji string is set as a background of the composite image as the decided layout.

According to the thirteenth aspect, the same effect as the first aspect can be obtained.

In the thirteenth aspect, the same matters as the matters specified in the second aspect to the twelfth aspect can be appropriately combined. In this case, a constituent performing a process or a function specified in the image processing method can be perceived as a constituent of the program for performing the corresponding process or function.

An image processing system according to a fourteenth aspect is an image processing system comprising an image analysis unit that analyzes an image and extracts an object from the image, a kanji string decision unit that decides a kanji string which includes one or more kanji characters related to the object, a layout decision unit that decides a layout in which the kanji string is composited with the image, and a composition unit that generates a composite image by compositing the kanji string with the image based on the layout, in which the layout decision unit decides a layout in which the object is set as a foreground of the composite image and the kanji string is set as a background of the composite image.

According to the fourteenth aspect, the same effect as the first aspect can be obtained.

In the fourteenth aspect, the same matters as the matters specified in the second aspect to the twelfth aspect can be appropriately combined. In this case, a constituent performing a process or a function specified in the image processing method can be perceived as a constituent of the image processing system performing the corresponding process or function.

A fifteenth aspect may be configured such that the image processing system of the fourteenth aspect further comprises a printing unit that prints the composite image.

According to the fifteenth aspect, a printed material on which the composite image is printed may be provided. Accordingly, the kanji can be enjoyed using the printed material.

An image processing system according to a sixteenth aspect is an image processing system connected through a network. The system comprises an image analysis unit that analyzes an acquired image and extracts an object from the image, a kanji string decision unit that decides a kanji string which includes one or more kanji characters related to the object, a layout decision unit that decides a layout in which the kanji string is composited with the image, and a composition unit that generates a composite image by compositing the kanji string with the image based on the layout, in which the layout decision unit decides a layout in which the object is set as a foreground of the composite image and the kanji string is set as a background of the composite image.

According to the sixteenth aspect, the same effect as the first aspect can be obtained.

In the sixteenth aspect, the same matters as the matters specified in the second aspect to the twelfth aspect can be appropriately combined. In this case, a constituent performing a process or a function specified in the image processing method can be perceived as a constituent of the image processing system performing the corresponding process or function.

A seventeenth aspect may be configured such that the image processing system of the sixteenth aspect further comprises a printing apparatus (printer) that is connected through the network and prints the composite image.

According to the seventeenth aspect, a printed material on which the composite image is printed may be provided. Accordingly, the kanji can be enjoyed using the printed material.

An eighteenth aspect may be configured such that in the image processing system of the seventeenth aspect, the printing apparatus (printer) includes the image analysis unit, the kanji string decision unit, the layout decision unit, and the composition unit and prints the composite image based on the image.

According to the eighteenth aspect, the printing apparatus (printer) may acquire the image of a processing target from a terminal apparatus, generate the composite image based on the acquired image, and provide the printed material on which the composite image is printed to the user.

A nineteenth aspect may be configured such that the image processing system of the seventeenth aspect or the eighteenth aspect further comprises a server apparatus that is connected through the network and includes the image analysis unit, the kanji string decision unit, the layout decision unit, and the composition unit.

According to the nineteenth aspect, the composite image can be generated using the server apparatus connected to the network.

According to the present invention, the kanji string related to the object included in the acquired image is extracted, and the kanji string is composited with the image by setting the object as a foreground and setting the kanji string as a background. Accordingly, the kanji string can be composited with the image including the object without degrading visibility of the object, and the image and the kanji can be enjoyed as a whole.

DESCRIPTION OF THE PREFERRED EMBODIMENTS

Hereinafter, preferred embodiments of the present invention will be described in accordance with the appended drawings. In the present specification, the same constituents will be designated by the same reference signs, and duplicate descriptions of such constituents will be appropriately omitted.

Overall Configuration of Image Processing System

Figure 1:
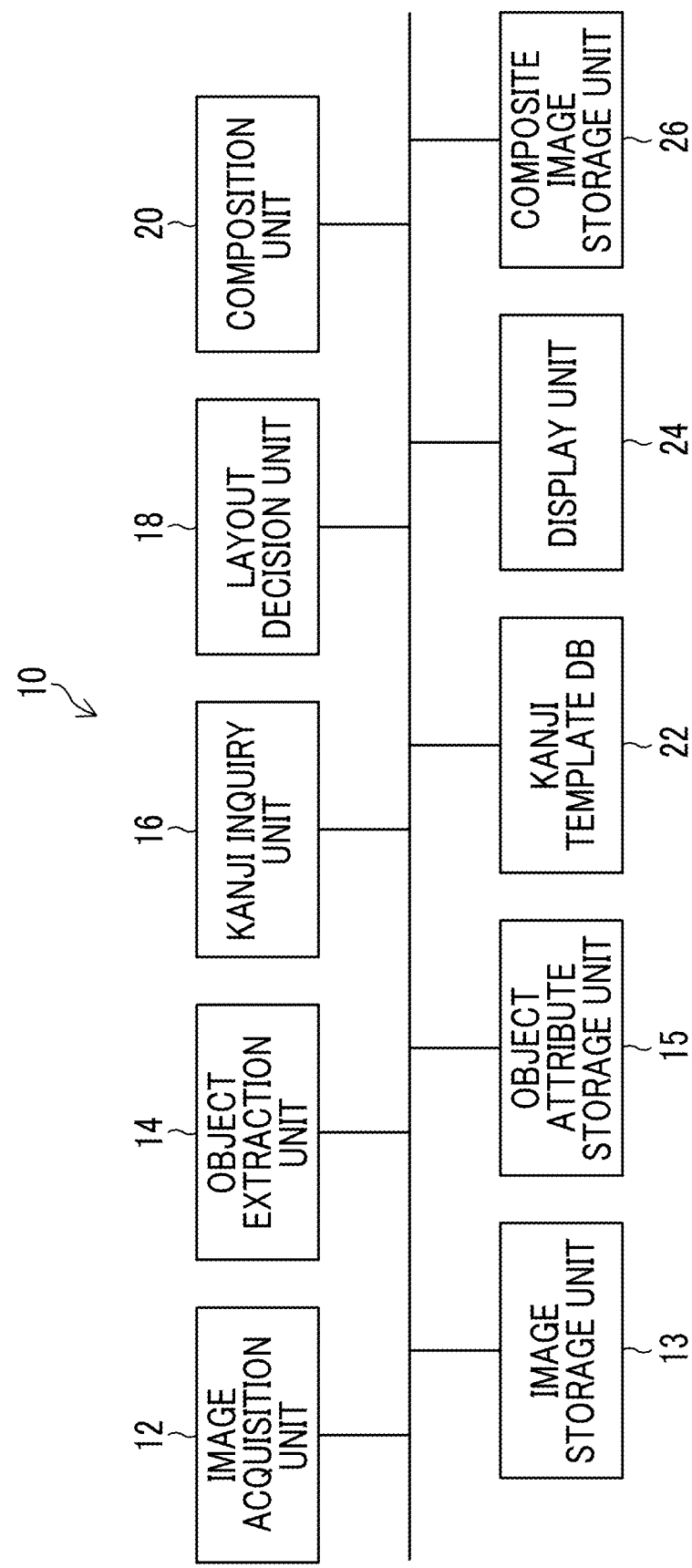
FIG. 1 is a function block diagram of an image processing system according to a first embodiment.

FIG. 1 is a function block diagram of an image processing system according to a first embodiment. An image processing system 10 illustrated in FIG. 1 generates a composite image by compositing a kanji string related to an object extracted from an image and an alphabet character string related to a meaning of the kanji string in the image.

In a case where the composite image is generated, the object is set as a foreground, and the kanji string is set as a background. In a case where a signal representing the composite image is transmitted to a printing terminal apparatus, the printing terminal apparatus generates a printed material on which the composite image is printed.

Hereinafter, an example in which one kanji character is applied as the kanji string and a hashtag is applied as the alphabet character string will be described. In the present specification, the term image may not only represent the image itself but also represent image data that is a signal representing the image.

The hashtag is a label in which a hash sign is provided ahead of the alphabet character string. The alphabet is any character that belongs to a character system that is applied to any language and has a constant arrangement order. For example, examples include a Latin character, a Greek character, and a Cyrillic character.

In the following embodiments, extraction of the hashtag related to the meaning of the kanji string and composition of the hashtag may be omitted.

A mobile terminal apparatus such as a smartphone may be applied to the image processing system 10. A computer such as a personal computer may also be applied to the image processing system 10. A desktop type computer, a laptop type computer, a tablet type computer, and the like may be applied to the computer.

Application software that generates the composite image is installed on the image processing system 10. The image processing system 10 may implement each function in the generation of the composite image by executing the application software generating the composite image.

The image processing system 10 comprises an image acquisition unit 12 and an image storage unit 13. The image acquisition unit 12 acquires an image that is captured using an imaging apparatus or the like incorporated in the smartphone. The image acquisition unit 12 stores the acquired image in the image storage unit 13.

The image processing system 10 may acquire an image of a processing target from an external storage device. For example, the image acquisition unit 12 may acquire the image of the processing target through a communication interface, not illustrated, such as a USB port and a slot into which a memory card can be inserted. USB is the abbreviation for Universal Serial Bus.

The image processing system 10 comprises an object extraction unit 14. The object extraction unit 14 analyzes the image of the processing target and extracts one or more objects from the image of the processing target. A well-known image processing technology may be applied to the object extraction. The object extraction unit 14 may extract a main subject or a constituent of a background as an object.

The object extraction unit 14 extracts object attribute information from the object extracted from the image of the processing target. The object attribute information may include a type of object, a direction of the object, a size of the object, a position of the object in the image, a color of the object, and the like. The object extraction unit 14 stores the object attribute information in an object attribute information storage unit 15 in association with the image. The object extraction unit 14 illustrated in the embodiment corresponds to one example of an image analysis unit.

The image processing system 10 comprises a kanji inquiry unit 16 and a kanji template database 22. By referring to the kanji template database 22, the kanji inquiry unit 16 inquires kanji representing details of the object and a hashtag representing a meaning of the kanji using the object attribute information as a parameter.

The kanji representing the details of the object corresponds to one example of a kanji string that includes one or more kanji characters related to an object. The hashtag representing the meaning of the kanji corresponds to one example of an alphabet character string related to a meaning of the kanji string.

The kanji template database 22 stores a combination of kanji representing a subject or the like imageable using the imaging apparatus or the like of the smartphone and the hashtag representing the meaning of the kanji in association with the subject. The kanji template database 22 may store a template obtained by combining the kanji with the hashtag in association with the subject.

That is, from the kanji template database 22, the kanji inquiry unit 16 reads out the template obtained by combining the kanji corresponding to the object attribute information with the hashtag. DB shown in FIG. 1 and the like is the abbreviation for Data Base.

The kanji template database 22 may be included outside the image processing system 10. The kanji template database 22 may be communicably connected to the image processing system 10 through a network or the like.

The image processing system 10 comprises a layout decision unit 18. The layout decision unit 18 decides a layout such as a position of the kanji template, which is read out from the kanji template database 22 using the kanji inquiry unit 16, in the image, a size of the kanji template, and a color of the kanji template in the composite image.

The layout decision unit 18 illustrated in the embodiment corresponds to one example of a kanji string decision unit that decides the kanji string including one or more kanji characters related to the object. In addition, the layout decision unit 18 corresponds to one example of an alphabet character string decision unit that decides the alphabet character string related to the meaning of the kanji string.

The image processing system 10 comprises a composition unit 20. The composition unit 20 generates the composite image by compositing the kanji template determined using the layout decision unit 18 with the image of the processing target.

The image processing system 10 comprises a display unit 24. A liquid crystal display of the smartphone is applied to the display unit 24. The display unit 24 displays the composite image generated using the composition unit 20.

The image processing system 10 comprises a composite image storage unit 26. In a case where the composition unit 20 acquires an instruction signal that represents that the composite image is stored, the composition unit 20 stores the composite image in the composite image storage unit 26.

Hardware Configuration of Image Processing System

Various processors may be applied to hardware of various processing units illustrated in FIG. 1. A central processing unit (CPU) and a graphics processing unit (GPU) may be applied to the various processors. The CPU is a general-purpose processor that functions as various processing units by executing a program. The GPU is a processor that is specialized in image processing.

A device that includes a dedicated electric circuit or the like may be applied as the various processors. Examples of the device including the dedicated electric circuit include a programmable logic device (PLD) and an application specific integrated circuit (ASIC). The PLD is a processor of which a circuit configuration can be changed after manufacturing of the device. The ASIC is a processor that has a circuit configuration dedicatedly designed to execute a specific process.

One processing unit may be configured using one of the above processors or may be configured using two or more of the above processors. Examples of configuring one processing unit using two or more of the processors include an example of configuring one processing unit using processors of the same type, and an example of configuring one processing unit using processors of different types.

An example of configuring one processing unit using processors of the same type is an example of using two or more FPGAs. An example of configuring one processing unit using the processors of different types is an example of configuring one processing unit using one or more CPUs and one or more FPGAs.

A plurality of processing units may be configured using one processor. An example of configuring the plurality of processing units using one processor is a form in which one processor is configured by applying a combination of one or more CPUs and a program and the processor having such configuration functions as the plurality of processing units. Specific examples of such a form include computers such as a server apparatus and a client apparatus.

Another example of configuring the plurality of processing units using one processor is a form in which using one IC chip, a processor that implements a function of the entire system including the plurality of processing units is used. A specific example of such a form is a system on chip. IC is the abbreviation for Integrated Circuit. The system on chip may be referred to as a system on chip (SoC) using an English representation.

Various processing units are configured using one or more of the various processors as a hardware structure. The hardware structure of the various processors is an electric circuit in which circuit elements such as semiconductor elements are combined. The electric circuit may be referred to as circuitry using an English representation.

Specific Example of Image Processing Apparatus

Figure 2:
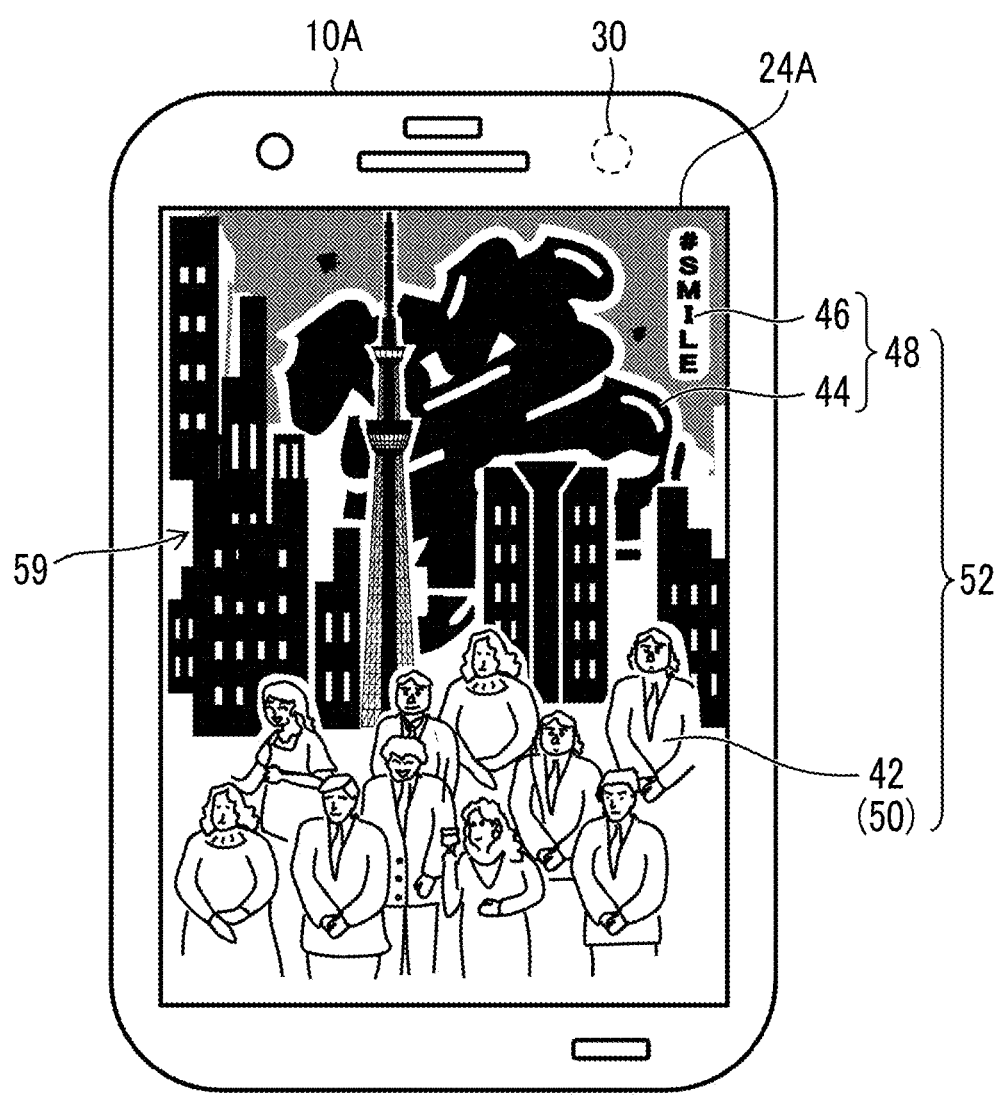
FIG. 2 is a front view of a smartphone according to a specific example of an image processing apparatus illustrated in FIG. 1.

FIG. 2 is a front view of the smartphone according to a specific example of an image processing apparatus illustrated in FIG. 1. A smartphone 10A illustrated in FIG. 2 displays a composite image 52 using a liquid crystal display 24A. Composite image generation application software is installed in advance on the smartphone 10A. Hereinafter, the composite image generation application software will be referred to as the application.

An operator of the smartphone 10A starts the application. The operator of the smartphone 10A starts an imaging apparatus 30 incorporated in the smartphone 10A and starts imaging. The liquid crystal display 24A displays a live view image. The imaging apparatus 30 disclosed in the embodiment corresponds to one example of an image acquisition unit.

In a case where a prescribed subject enters a focus region, a kanji template 48 that includes a kanji string 44 including one or more kanji characters corresponding to an object 42 which is the subject, and includes a hashtag 46 representing a meaning of the kanji string 44 is read out. The kanji template 48 is composited in an image 50 that includes the object 42. The composite image 52 in which the kanji template 48 is composited in the image 50 is displayed on the liquid crystal display 24A.

In a case where an imaging button not illustrated is operated in a state where the composite image 52 is displayed on the liquid crystal display 24A, the imaging apparatus 30 stores the image 50. The application generates the composite image 52 in which the kanji template 48 is composited in the image 50. The application stores the composite image 52.

An image 50 in which a plurality of smiling persons in a scene 59 of a city behind the persons are captured is applied to a composite image 52 illustrated in FIG. 2. In the composite image 52, smile that is related to the plurality of smiling persons extracted as an object 42 is composited as a kanji string 44 with the image 50. In addition, in the composite image 52, #SMILE that is related to the kanji string 44 of smile is composited as a hashtag 46 with the image 50.

That is, in the composite image 52, the kanji string 44 is cut along contours of the object 42 and the scene 59 of the city. That is, in the composite image 52, the object 42 and the scene 59 of the city are set as a foreground, and the kanji string 44 and the hashtag 46 are set as a background.

A decorative character having a white edge is applied to the kanji string 44. The same color as the kanji string 44 is applied to the hashtag 46. In addition, the same color as the edge of the kanji string 44 is applied to a background color of the hashtag 46. The image 50 may be generated by setting the scene 59 of the city as a background, setting the plurality of persons as a foreground, and compositing both of the scene 59 and the plurality of persons.

Description of Function Blocks of Layout Decision Unit

Figure 3:
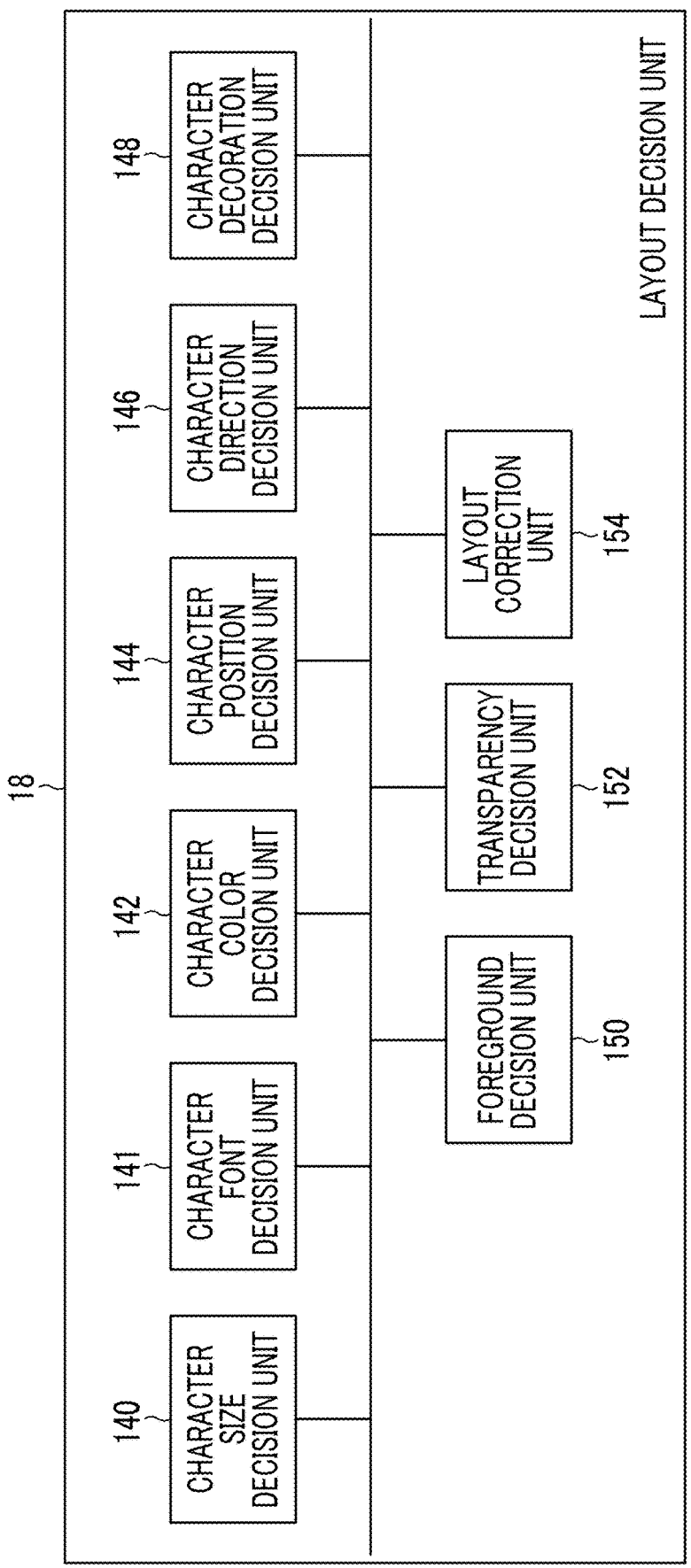
FIG. 3 is a function block diagram of a layout decision unit illustrated in FIG. 1.

FIG. 3 is a function block diagram of a layout decision unit illustrated in FIG. 1. A layout decision unit 18 comprises a character size decision unit 140, a character font decision unit 141, a character color decision unit 142, a character position decision unit 144, a character direction decision unit 146, a character decoration decision unit 148, a foreground decision unit 150, and a transparency decision unit 152.

The character size decision unit 140 decides sizes of the kanji string 44 and the hashtag 46. The character size decision unit 40 may decide the size of the kanji string 44 depending on the size and the like of the object 42 included in the object attribute information. The character size decision unit 40 decides the size of the hashtag 46 depending on the size of the kanji string 44.

The character font decision unit 141 decides fonts of the kanji string 44 and the hashtag 46. A font that is standardized in a printing field may be applied to the fonts, or an original font may be applied to the fonts. The character font decision unit 141 may individually set the font applied to the kanji string 44 and the font applied to the hashtag 46.

The character color decision unit 142 decides colors of the kanji string 44 and the hashtag 46. The character color decision unit 142 may decide the color of the kanji string 44 depending on the color of the object included in the object attribute information. The character color decision unit 142 decides the color of the hashtag 46 depending on the color of the kanji string 44.

The character color decision unit 142 decides whether or not to apply an outline character to the kanji string 44 and the hashtag 46. The character color decision unit 142 decides a background color of the outline character in a case where the outline character is applied to the kanji string 44 and the hashtag 46. An aspect in which a character is transparent may be employed as the outline character.

The character position decision unit 144 decides positions of the kanji string 44 and the hashtag 46. Coordinates set in the acquired image 50 may be applied to the positions of the kanji string 44 and the hashtag 46. The character position decision unit 144 may decide coordinates of the kanji string 44 depending on coordinates of the object. The character position decision unit 144 may decide coordinates of the hashtag 46 depending on the coordinates of the kanji string 44. Coordinates of a center position of the kanji string 44 may be applied to the coordinates of the kanji string 44. Coordinates of a center position of the hashtag 46 may be applied to the coordinates of the hashtag 46.

The character direction decision unit 146 decides directions of the kanji string 44 and the hashtag 46. The character direction decision unit 146 may apply angles with respect to a reference direction set in the image 50 as the directions of the kanji string 44 and the hashtag 46. The character direction decision unit 146 may decide the direction of the kanji string 44 depending on the direction of the object. The character direction decision unit 146 may decide the direction of the hashtag 46 depending on the direction of the kanji string 44.

The character decoration decision unit 148 decides whether or not to perform a decoration process on the kanji string 44 and the hashtag 46. The character decoration decision unit 148 may perform the decoration process on the kanji string 44 depending on details of the kanji string 44. The character decoration decision unit 148 may perform the decoration process on the hashtag 46 depending on the decoration process performed on the kanji string 44.

The foreground decision unit 150 decides whether to set the kanji string 44 and the hashtag 46 as a foreground or a background. The foreground decision unit 150 may change initial setting in which the kanji string 44 and the hashtag 46 are set as a foreground to setting in which the kanji string 44 and the hashtag 46 are set as a background.

The transparency decision unit 152 sets degrees of transparency of the kanji string 44 and the hashtag 46 in a case where the kanji string 44 and the hashtag 46 are foregrounds. The transparency decision unit 152 may apply a transparency level as an index value that represents the degree of transparency. In a case where the kanji string 44 and the hashtag 46 correspond to the outline character, the transparency decision unit 152 decides the transparency level of the background of the outline character.

The transparency level is obtained such that a state where the background is not seen through the foreground is 0 percent and a state where the foreground is transparent is 100 percent. The transparency decision unit 152 may set the transparency levels of the kanji string 44 and the hashtag 46 to a value that exceeds 0 percent and is less than 100 percent. The transparency decision unit 152 may set the transparency level of the background of the outline character to a value that exceeds 0 percent and is less than 100 percent.

The layout decision unit 18 comprises a layout correction unit 154. The layout correction unit 154 corrects the layout in a case where the image processing system 10 receives an instruction signal representing correction of the layout.

The layout correction unit 154 may correct a character size, a character color, a character position, a character direction, and character decoration. The layout correction unit 154 may correct the foreground and the background and correct the degree and the like of transparency of the foreground.

Flowchart of Image Processing Method

Figure 4:
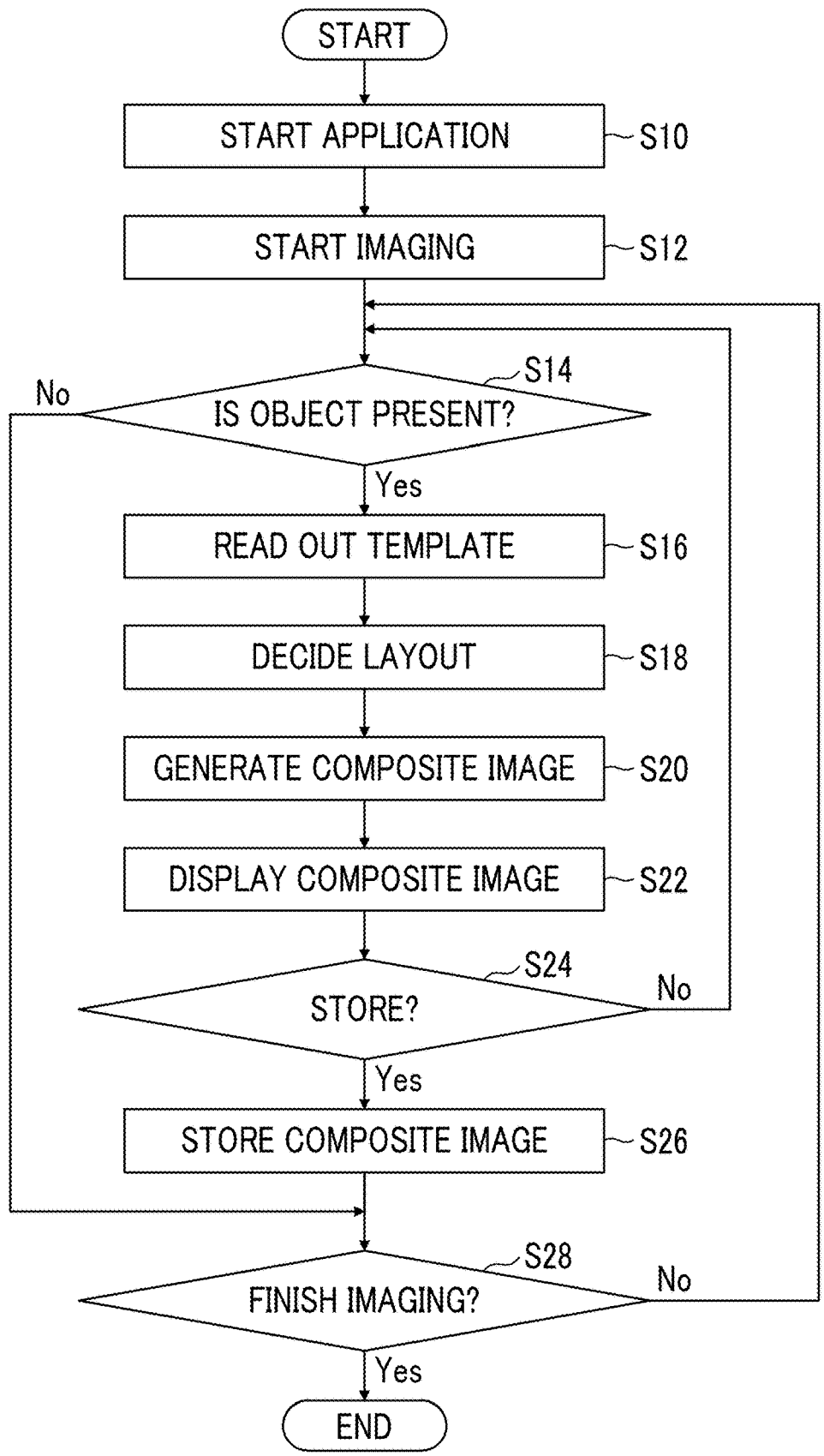
FIG. 4 is a flowchart illustrating a procedure of image processing method according to the first embodiment.

FIG. 4 is a flowchart illustrating a procedure of image processing method according to the first embodiment. In application start step S10, the operator of the smartphone 10A illustrated in FIG. 2 starts the application by operating an operation button of the smartphone 10A. After application start step S10, the procedure of image processing method proceeds to imaging start step S12.

In imaging start step S12, the operator of the smartphone 10A starts the imaging apparatus 30 incorporated in the smartphone 10A by operating the operation button of the smartphone 10A. The operator of the smartphone 10A directs a lens of the imaging apparatus 30 to an imaging target. The lens of the imaging apparatus 30 is not illustrated. The liquid crystal display 24A of the smartphone 10A displays a live view image of the imaging target. After imaging start step S12, the procedure of image processing method proceeds to object extraction step S14.

In object extraction step S14, the object extraction unit 14 illustrated in FIG. 1 determines whether or not the prescribed subject enters the focus region of the imaging apparatus 30. In object extraction step S14, a No determination is made in a case where the object extraction unit 14 determines that the prescribed subject does not enter the focus region of the imaging apparatus 30. In the case of the No determination, the procedure of image processing method proceeds to imaging finish determination step S28.

Meanwhile, in object extraction step S14, a Yes determination is made in a case where the object extraction unit 14 determines that the prescribed subject enters the focus region of the imaging apparatus 30. In the case of the Yes determination, the object extraction unit 14 extracts the prescribed subject as the object 42, and the procedure of image processing method proceeds to template reading step S16. Object extraction step S14 illustrated in the embodiment corresponds to one example of an image analysis step.

In template reading step S16, the kanji inquiry unit 16 reads out the kanji template 48 corresponding to the object 42 from the kanji template database 22. After template reading step S16, the procedure of image processing method proceeds to layout decision step S18.

Template reading step S16 illustrated in the embodiment corresponds to one example of a kanji string decision step of deciding a kanji string that includes one or more kanji characters related to an object. In addition, template reading step S16 corresponds to one example of an alphabet character string decision step of deciding an alphabet character string related to a meaning of the kanji string.

In layout decision step S18, the layout decision unit 18 decides a layout of the composite image 52 based on the kanji template 48 and the image 50. After layout decision step S18, the procedure of image processing method proceeds to composite image generation step S20.

Layout decision step S18 may include a kanji string correction step of correcting the decided kanji string 44. In addition, layout decision step S18 may include a hashtag correction step of correcting the decided hashtag 46. The hashtag correction step illustrated in the embodiment corresponds to one example of an alphabet character string correction step.

In composite image generation step S20, the composition unit 20 generates the composite image 52 in which the kanji template 48 and the image 50 are composited. After composite image generation step S20, the procedure of image processing method proceeds to composite image display step S22.

In composite image display step S22, the display unit 24 displays the composite image 52. After composite image display step S22, the procedure of image processing method proceeds to composite image storage determination step S24.

In composite image storage determination step S24, the image processing system 10 determines whether or not the imaging button of the smartphone 10A is operated from a timing at which the composite image is displayed on the display unit 24.

In composite image storage determination step S24, a No determination is made in a case where it is determined that a certain period elapses in the image processing system 10 without operating the imaging button of the smartphone 10A from the timing at which the composite image is displayed on the display unit 24. In the case of the No determination, the procedure of image processing method proceeds to object extraction step S14. Then, each step of object extraction step S14 to composite image storage determination step S24 is repeatedly performed until a Yes determination is made in composite image storage determination step S24.

Meanwhile, in composite image storage determination step S24, the Yes determination is made in a case where it is determined that the imaging button of the smartphone 10A is operated in the image processing system 10 within an elapse of a certain period from the timing at which the composite image is displayed on the display unit 24. In the case of the Yes determination, the procedure of image processing method proceeds to composite image storage step S26.

In composite image storage step S26, the composition unit 20 stores the composite image 52 in the composite image storage unit 26. After composite image storage step S26, the procedure of image processing method proceeds to imaging finish determination step S28.

In imaging finish determination step S28. the image processing system 10 determines whether or not to finish imaging. In imaging finish determination step S28, a No determination is made in a case where the image processing system 10 determines not to finish imaging. In the case of the No determination, the procedure of image processing method proceeds to object extraction step S14, and each step of object extraction step S14 to imaging finish determination step S28 is repeatedly performed until a Yes determination is made in imaging finish determination step S28.

Meanwhile, in imaging finish determination step S28, the Yes determination is made in a case where the image processing system 10 determines to finish imaging. In the case of the Yes determination, the image processing system 10 finishes the image processing method.

Flowchart of Layout Decision Step

Figure 5:
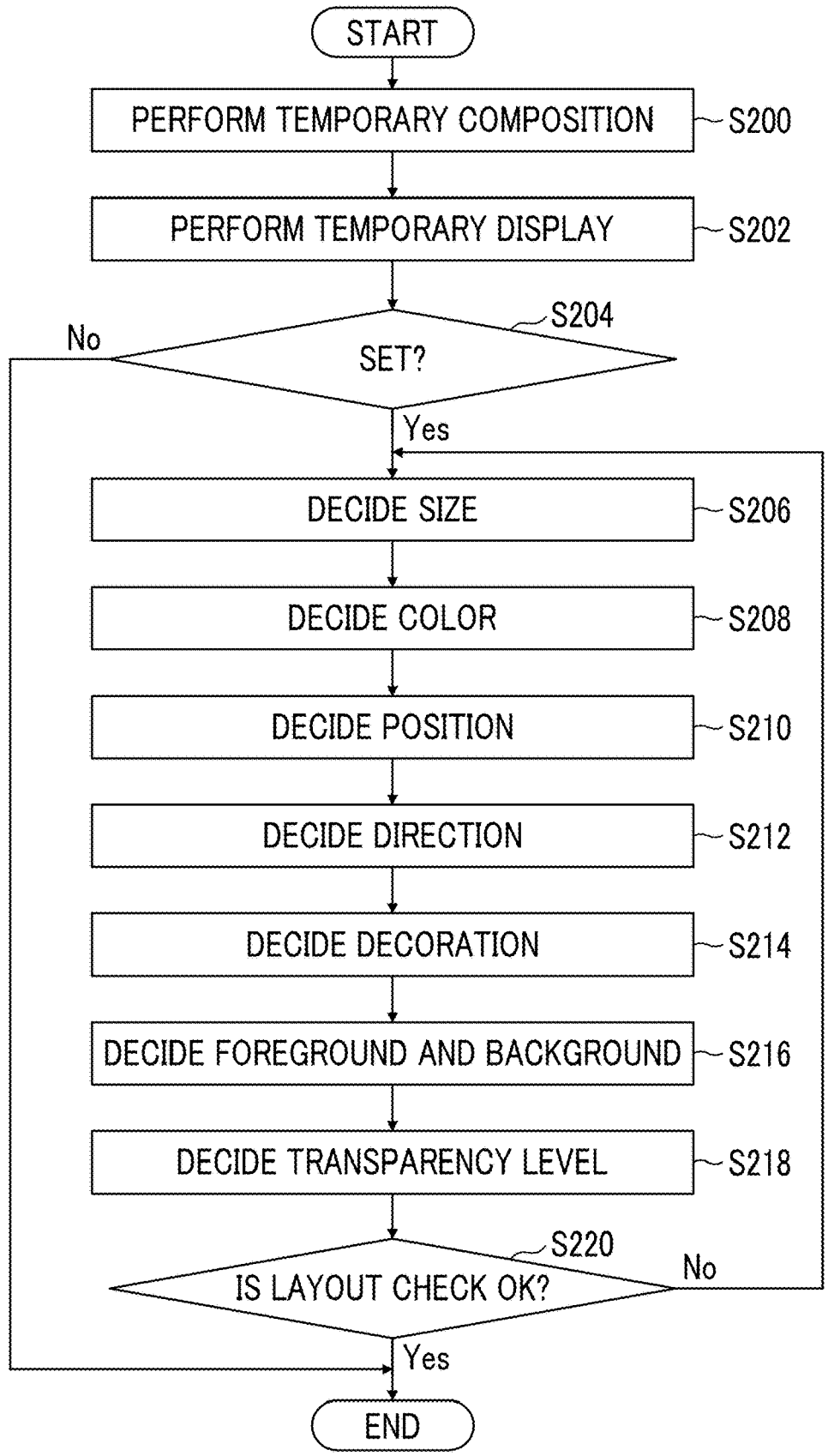
FIG. 5 is a flowchart illustrating a procedure of layout decision step illustrated in FIG. 4.

FIG. 5 is a flowchart illustrating a procedure of layout decision step illustrated in FIG. 4. In temporary composition step S200, the layout decision unit 18 illustrated in FIG. 1 generates a temporary composite image in which the image 50 and the kanji template 48 are composited. After temporary composition step S200, the procedure of layout decision step proceeds to temporary display step S202.

In temporary display step S202, the layout decision unit 18 displays the temporary composite image using the liquid crystal display 24A illustrated in FIG. 2. After temporary display step S202, the procedure of layout decision step proceeds to setting determination step S204. In setting determination step S204, the layout decision unit 18 determines whether or not to set the layout for the temporary composite image.

In setting determination step S204, a No determination is made in a case where the layout decision unit 18 determines not to perform setting for the temporary composite image. In the case of the No determination, the layout decision unit 18 finishes the layout decision step and proceeds to composite image generation step S20 in FIG. 4.

Meanwhile, in setting determination step S204, a Yes determination is made in a case where the layout decision unit 18 determines to perform setting for the temporary composite image. In the case of the Yes determination, the procedure of layout decision step proceeds to size decision step S206.

In setting determination step S204, the layout decision unit 18 may display a selection screen on which it is configured that whether or not to perform setting for the temporary composite image can be selected, using the liquid crystal display 24A. A user may provide an instruction to perform setting for the temporary composite image by operating the selection screen.

In size decision step S206, the character size decision unit 140 illustrated in FIG. 3 decides a size of the kanji template 48. After size decision step S206, the procedure of image processing method proceeds to color decision step S208. In color decision step S208, the character color decision unit 142 decides a color of the kanji template 48.

In color decision step S208, the character color decision unit 142 decides whether or not to apply the outline character to the kanji template 48. In a case where the outline character is applied to the kanji template 48, the character color decision unit 142 decides the background color of the outline character.

An example of a case where the outline character is applied to the kanji template 48 in color decision step S208 is a case where the user designates application of the outline character to the kanji template 48 using a user interface.

That is, color decision step S208 may include an outline character application determination step of determining whether or not to apply the outline character to the kanji template 48, and a background color decision step of deciding the background color of the outline character. After color decision step S208, the procedure of layout decision step proceeds to position decision step S210.

In position decision step S210, the character position decision unit 144 decides a position of the kanji template 48. After position decision step S210, the procedure of image processing method proceeds to direction decision step S212. In direction decision step S212. the character direction decision unit 146 decides a direction of the kanji template 48. After direction decision step S212, the procedure of layout decision step proceeds to decoration decision step S214.

In decoration decision step S214, the character decoration decision unit 148 decides the presence or absence of decoration of the kanji template 48. The character decoration decision unit 148 decides details of decoration in a case where the kanji template 48 is decorated. After decoration decision step S214, the procedure of layout decision step proceeds to foreground and background decision step S216.

In foreground and background decision step S216, the foreground decision unit 150 decides a layout in which the object 42 is set as a foreground and the kanji template 48 is set as a background. In foreground and background decision step S216, the foreground decision unit 150 may decide whether or not to set a non-object excluding the object 42 in the image 50 as a foreground of the kanji template 48. After foreground and background decision step S216. the procedure of layout decision step proceeds to transparency level decision step S218.

In transparency level decision step S218, the transparency decision unit 152 decides a transparency level of the kanji template 48. After transparency level decision step S218, the procedure of image processing method proceeds to layout check determination step S220. In layout check determination step S220, a No determination is made in a case where the layout decision unit 18 determines that the layout needs to be corrected. In the case of the No determination, the procedure of layout decision step proceeds to size decision step S206. Then, each step of size decision step S206 to layout check determination step S220 is repeatedly performed until a Yes determination is made in layout check determination step S220.

Meanwhile, in layout check determination step S220, the Yes determination is made in a case where the layout decision unit 18 determines that the layout does not need to be corrected. In the case of the Yes determination, the layout decision unit 18 finishes the layout setting step and proceeds to composite image generation step S20 in FIG. 4.

In the flowchart illustrated in FIG. 5, steps other than the foreground and background decision step S216 among steps of size decision step S206 to layout check determination step S220 may be appropriately omitted. The flowchart of the layout setting step illustrated in FIG. 5 can also be applied to a flowchart in a case where the layout is corrected.

In the present embodiment, the kanji template 48 is set as a unit of decision of the size, the position, and the like. Alternatively, the size, the position, and the like may be individually decided for each of the kanji string and the alphabet character string.

Specific Example of Kanji Template Database

Figure 6:
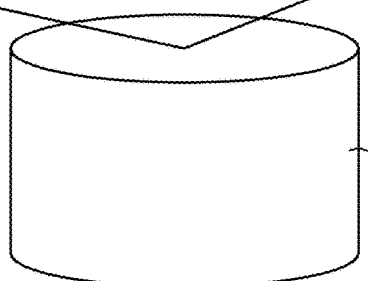
FIG. 6 is a descriptive diagram of a specific example of a kanji template database.

FIG. 6 is a descriptive diagram of a specific example of the kanji template database. The kanji template database 22 illustrated in FIG. 6 stores a correspondence relationship between the object attribute information and a combination of the kanji string 44 and the hashtag 46.

In the kanji template database 22, one or more kanji characters are associated with one object attribute information. In addition, in the kanji template database 22, one or more hashtags 46 are associated with one kanji string 44. The kanji inquiry unit 16 illustrated in FIG. 1 can selectively decide the combination of the kanji string 44 and the hashtag 46 based on one object attribute information.

In the kanji template database 22, the combination of the kanji string 44 and the hashtag 46 may be inquired using the object attribute information as a parameter. In the kanji template database 22, the object attribute information may be added, and the combination of the kanji string 44 and the hashtag 46 corresponding to the added object attribute information may be added.

The kanji template database 22 illustrated in the embodiment is applied in the kanji string decision step of deciding one or more kanji strings of a composition target from a plurality of kanji string candidates representing the object.

In addition, the kanji template database 22 illustrated in the embodiment is applied in the alphabet character string decision step of deciding an alphabet character string of a composition target from a plurality of alphabet character string candidates representing a meaning of the kanji string.

Modification Example of Kanji Inquiry Unit and Template Reading Step

A learning device that learns the correspondence relationship between the object attribute information and the kanji template 48 may be applied to the kanji inquiry unit 16 illustrated in FIG. 1 and template reading step S16 illustrated in FIG. 4. That is, the kanji inquiry unit 16 may decide the kanji template 48 corresponding to the object attribute information using a learning device that learns a correspondence relationship between the object attribute information and the kanji string 44, and a learning device that learns a correspondence relationship between the kanji string 44 and the hashtag 46.

Deep learning such as a convolutional neural network may be applied to the learning device. The kanji inquiry unit 16 to which the learning device is applied may perform re-learning using a decision result of the kanji template 48.

Effects of Image Processing System and Image Processing Method According to First Embodiment According to the image processing system 10 and the image processing method according to the first embodiment, the following effects can be obtained.

[1] In imaging using the imaging apparatus 30 of the smartphone 10A, the composite image 52 in which the kanji string 44 related to the object 42 extracted from the image 50 is composited with the image 50 is displayed using the liquid crystal display 24A. In the composite image, the object 42 is set as a foreground, and the kanji string 44 is set as a background. Accordingly, the kanji string 44 can be composited with the image 50 including the object 42 without degrading visibility of the object 42, and foreigners and the like can conveniently enjoy kanji.

[2] In the composite image 52, the outline character is applied to the kanji string 44. Accordingly, the composite image 52 in which both of the object 42 and the kanji string 44 are highlighted and excellent design quality is obtained may be generated. In addition, in the composite image 52, the non-object in the image 50 may be visually recognized.

[3] In the composite image 52. semi-transparency is applied to the background of the outline character. Accordingly, in the composite image 52, the non-object of the image 50 may be visually recognized.

[4] In the composite image 52, a layout in which at least a part of the non-object is seen through the kanji string 44 to which the outline character is applied is applied. Accordingly, in the composite image 52, the entire image 50 may be visually recognized.

[5] In the composite image 52, a part of the object is superimposed on the background of the outline character. Accordingly, the object 42 is highlighted in the composite image 52.

[6] In the composite image 52, the kanji string 44 is arranged away from the subject of the image. Accordingly, visibility of the subject in the composite image may be secured.

[7] In the composite image 52, the kanji string 44 is arranged at a position in superimposition with the subject of the image. Accordingly, the kanji string 44 may be highlighted in the composite image 52.

[8] In the composite image 52, the hashtag 46 related to the meaning of the kanji string 44 is composited. Accordingly, foreigners and the like who have difficulty in understanding the meaning of the kanji string 44 can understand the meaning of the kanji string, and foreigners and the like can enjoy kanji.

[9] In the composite image 52, the same layout as the kanji string 44 is applied to the hashtag 46. Accordingly, the same effect as the kanji string 44 can be obtained for the hashtag 46.

Description of Image Processing System According to Second Embodiment

Figure 7:
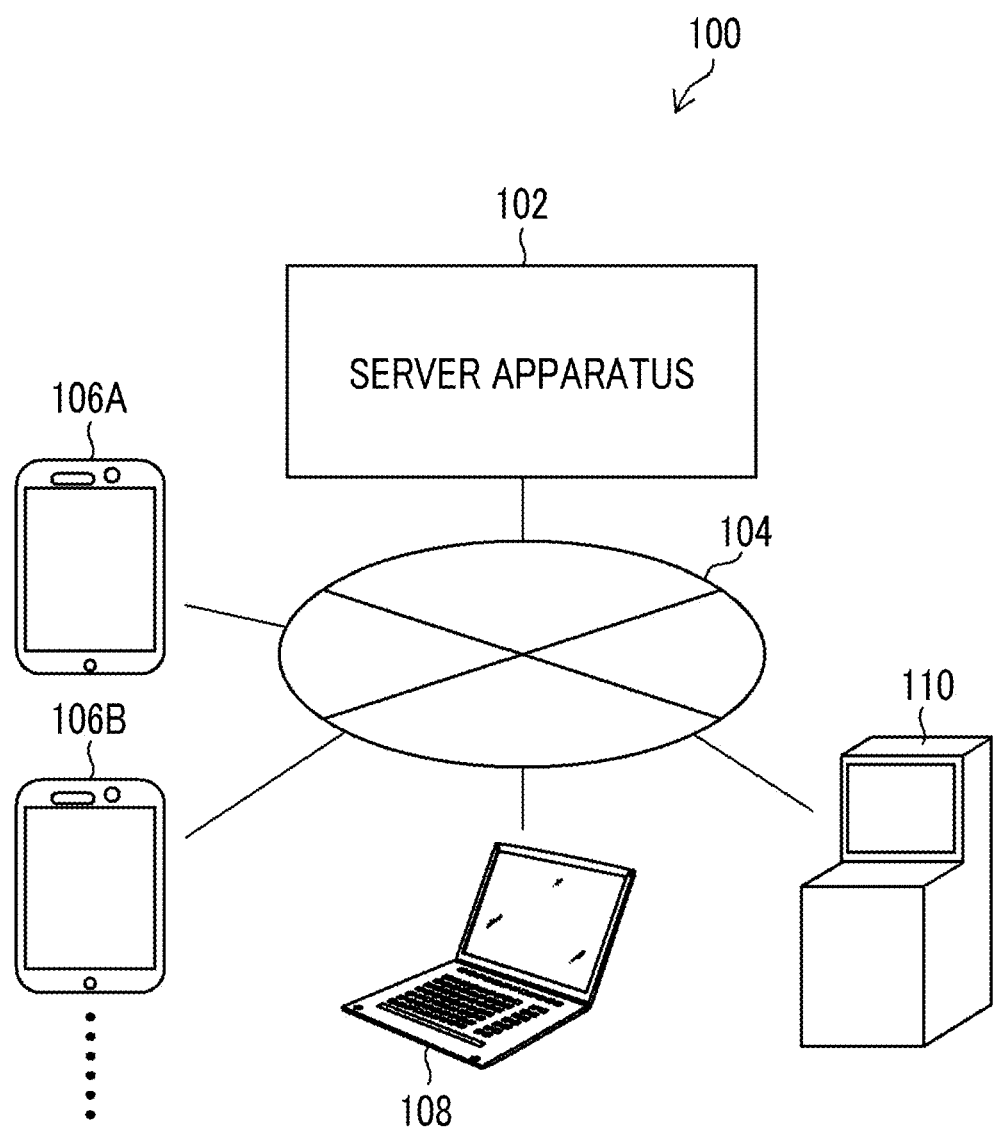
FIG. 7 is a configuration diagram of an image processing system according to a second embodiment.

FIG. 7 is a configuration diagram of an image processing system according to a second embodiment. An image processing system 100 illustrated in FIG. 7 comprises a server apparatus 102. The server apparatus 102 is communicably connected to a terminal apparatus through a network 104.

In FIG. 7, a plurality of smartphones including a first smartphone 106A and a second smartphone 106B are illustrated as terminal apparatuses. In addition, in FIG. 7, a laptop type personal computer 108 and a self-printing terminal apparatus 110 are illustrated as other terminal apparatuses.

A hardware configuration in the image processing system 10 illustrated in FIG. 1 may be applied to the server apparatus 102 illustrated in FIG. 7. A function of the server apparatus 102 will not be described here. The server apparatus 102 comprises a communication interface, not illustrated. The server apparatus 102 is communicably connected to the network 104 through the communication interface.

The self-printing terminal apparatus 110 is installed at tourist locations such as an airport, a station, accommodations, and a store. The self-printing terminal apparatus 110 may provide a print service for printing images possessed by the tourists.

Configuration Example of Self-Printing Terminal Apparatus

Figure 8:
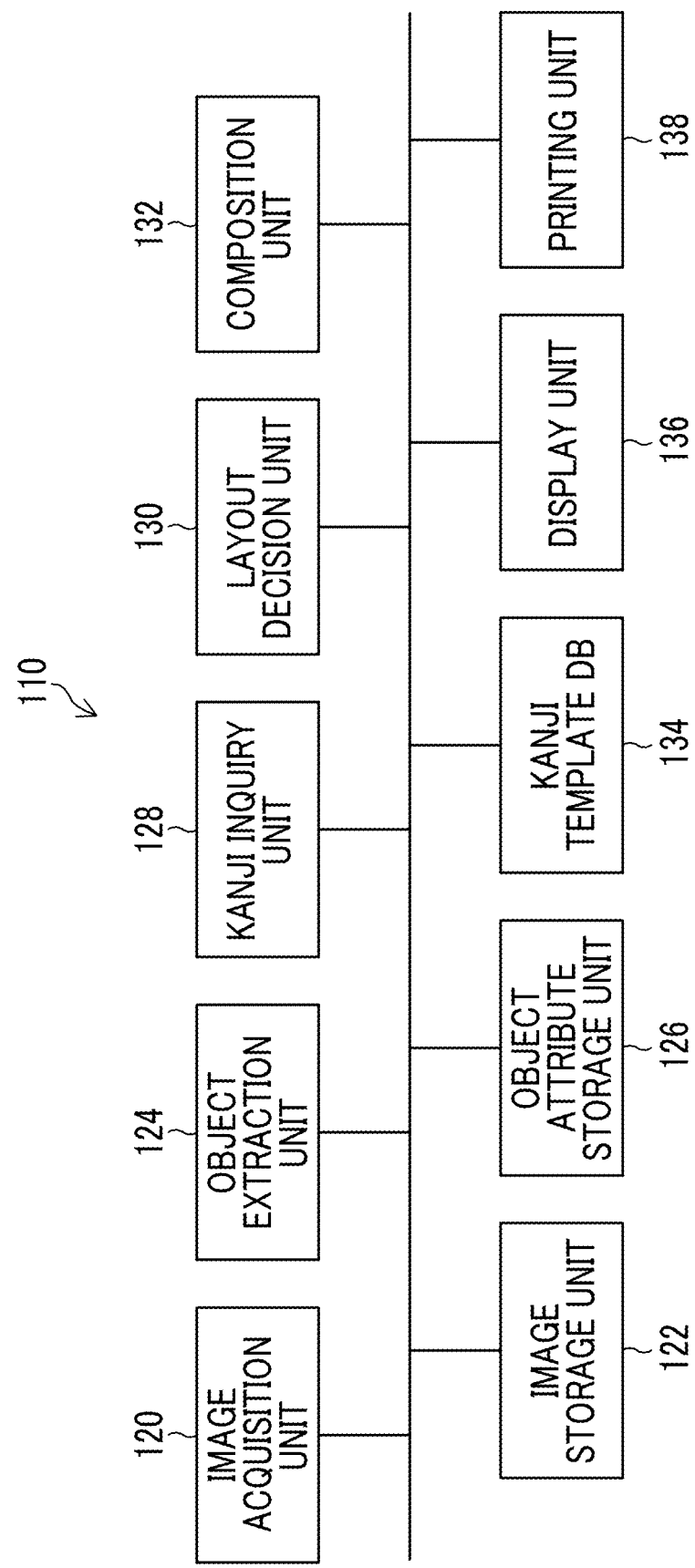
FIG. 8 is a function block diagram of a self-printing terminal apparatus illustrated in FIG. 7.

FIG. 8 is a function block diagram of the self-printing terminal apparatus illustrated in FIG. 7. The same configuration as the image processing system 10 illustrated in FIG. 1 may be applied to a hardware configuration of the self-printing terminal apparatus 110.

The self-printing terminal apparatus 110 illustrated in FIG. 8 comprises an image acquisition unit 120, an image storage unit 122, an object extraction unit 124, an object attribute information storage unit 126, a kanji inquiry unit 128, a layout decision unit 130, a composition unit 132, a kanji template database 134, and a display unit 136. In addition, the self-printing terminal apparatus 110 comprises a printing unit 138.

The image acquisition unit 120, the image storage unit 122, the object extraction unit 124, the object attribute information storage unit 126, the kanji inquiry unit 128, the layout decision unit 130, the composition unit 132, the kanji template database 134, and the display unit 136 in the self-printing terminal apparatus 110 are the same as the units of the image processing system 10 illustrated in FIG. 1. These units will not be described here.

The printing unit 138 illustrated in FIG. 8 prints the composite image. An inkjet method printing apparatus may be applied to the printing unit 138. An electrophotographic method printing apparatus may also be applied to the printing unit 138.

The image is uploaded to the self-printing terminal apparatus 110 from a terminal apparatus such as the first smartphone 106A illustrated in FIG. 7 through the network 104. The self-printing terminal apparatus 110 extracts the object and the object attribute information from the image, selects the kanji template, and decides the layout in the composite image based on the kanji template.

The self-printing terminal apparatus 110 generates the composite image based on the decided layout. The self-printing terminal apparatus 110 prints the composite image.

The kanji template database 134 illustrated in FIG. 8 may be arranged outside the self-printing terminal apparatus 110 and be communicably connected to the self-printing terminal apparatus 110 through the network 104.

The server apparatus 102 illustrated in FIG. 8 may comprise the object extraction unit 124, the object attribute information storage unit 126, the kanji inquiry unit 128, the layout decision unit 130, and the composition unit 132 in the self-printing terminal apparatus 110.

The image is uploaded to the server apparatus 102 from the terminal apparatus such as the first smartphone 106A through the network 104. The server apparatus 102 generates the composite image based on the uploaded image. The self-printing terminal apparatus 110 may download the composite image, display the composite image using the display unit 136, and print the composite image using the printing unit 138.

Flowchart of Image Processing Method According to Second Embodiment

Figure 9:
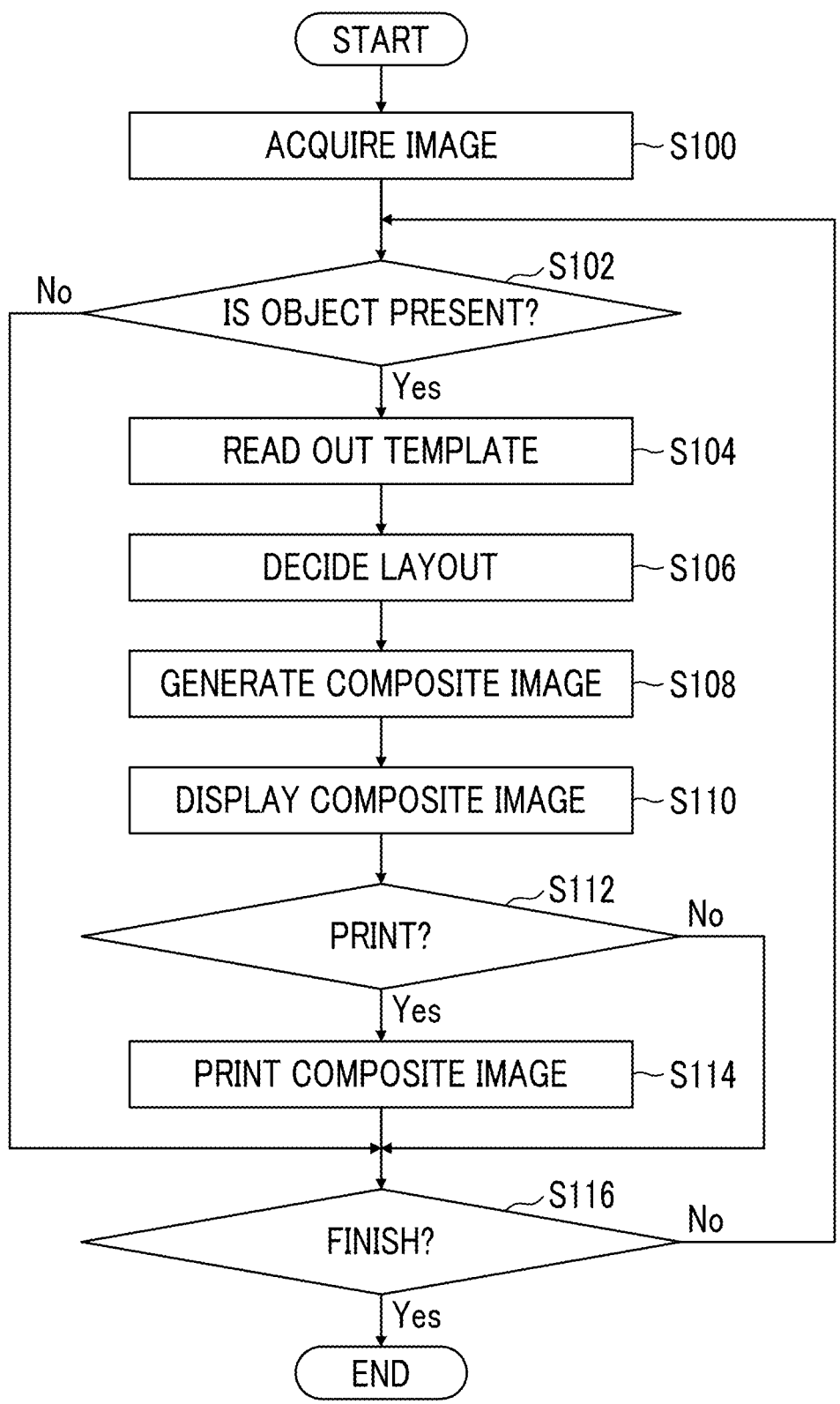
FIG. 9 is a flowchart illustrating a procedure of image processing method according to the second embodiment.

FIG. 9 is a flowchart illustrating a procedure of image processing method according to the second embodiment. Duplicate descriptions of the steps in the flowchart illustrated in FIG. 4 will be appropriately omitted below. In image acquisition step S100, the image acquisition unit 120 illustrated in FIG. 8 acquires the image of the processing target. For example, the image acquisition unit 120 may acquire the image from a memory card that is detached from the first smartphone 106A or the like capturing the image. In addition, the image acquisition unit 120 may acquire the image from a memory of the imaging apparatus through a communication port that is communicably connected to the first smartphone 106A or the like capturing the image.

In FIG. 7, the self-printing terminal apparatus 110 is wirelessly communicably connected to the first smartphone 106A or the like through the network 104. Alternatively, wired communication may be applied to communication between the self-printing terminal apparatus 110 and the first smartphone 106A or the like.

The self-printing terminal apparatus 110 may acquire the image which is uploaded to the server apparatus 102 from the first smartphone 106A or the like, from the server apparatus 102 based on an instruction signal that is transmitted from the first smartphone 106A or the like. The image acquisition unit 120 stores the acquired image in the image storage unit 122. After image acquisition step S100, the procedure of image processing method proceeds to object extraction step S102.

In object extraction step S102, the object extraction unit 124 extracts one or more objects from the acquired image. In object extraction step S102, a No determination is made in a case where the object extraction unit 124 does not extract the object. In the case of the No determination, the procedure of image processing method proceeds to finish determination step S116.

Meanwhile, in object extraction step S102, a Yes determination is made in a case where the object extraction unit 124 extracts one or more objects from the image. In the case of the Yes determination, the procedure of image processing method proceeds to template reading step S104. After template reading step S104, each step of layout decision step S106, composite image generation step S108, and composite image display step S110 is performed in this order in the procedure of image processing method.

In the steps of template reading step S104 to composite image display step S110 illustrated in FIG. 9, the same processes as the steps of template reading step S16 to composite image display step S22 illustrated in FIG. 4 are respectively performed. After composite image display step S110, the procedure of image processing method proceeds to printing determination step S112.

In printing determination step S112, the printing unit 138 determines whether or not a printing command signal is acquired. In printing determination step S112, a No determination is made in a case where it is determined that the printing unit 138 does not acquire the printing command signal. In the case of the No determination, the procedure of image processing method proceeds to finish determination step S116.

An example in which the printing unit 138 determines that the printing command signal is not acquired in printing determination step S112 is a case where buttons for selecting whether or not to perform printing are displayed on the display unit 136 and the button for selecting not to perform printing is operated.

Meanwhile, in printing determination step S112, a Yes determination is made in a case where it is determined that the printing unit 138 acquires the printing command signal. In the case of the Yes determination, the procedure of image processing method proceeds to composite image printing step S114. An example in which the printing unit 138 determines that the printing command signal is acquired in printing determination step S112 is a case where the button displayed on the display unit 136 for selecting to perform printing is operated.

In composite image printing step S114, the printing unit 138 prints the composite image. In composite image printing step S114, a printing condition setting step of setting a printing condition such as a size of printing paper, image quality, and resolution may be performed.

In addition, in printing determination step S112, a billing condition setting step of setting a billing condition for printing may be performed. The billing condition may include a payment condition such as cash payment, electronic money payment, and credit card payment. After composite image printing step S114, the procedure of image processing method proceeds to finish determination step S116.

In finish determination step S116, the self-printing terminal apparatus 110 determines whether or not a prescribed finish condition is satisfied. An example of the finish condition is a case where finishing the image processing method is selected on a finish selection screen for selecting whether or not to finish the image processing method.

In finish determination step S116, a No determination is made in a case where the self-printing terminal apparatus 110 determines that the prescribed finish condition is not satisfied. In the case of the No determination, the procedure of image processing method proceeds to object extraction step S102. Then, each step of object extraction step S102 to finish determination step S116 is repeatedly executed until a Yes determination is made in finish determination step S116.

Meanwhile, in finish determination step S116, the Yes determination is made in a case where the self-printing terminal apparatus 110 determines that the prescribed finish condition is satisfied. In the case of the Yes determination, the self-printing terminal apparatus 110 finishes the image processing method by performing a prescribed finish process.

In a case where image processing is finished, the self-printing terminal apparatus 110 may display a finish message such as character information representing that the object is not extracted from the image, and character information representing that image processing is finished, using the display unit 136.

Effects of Image Processing System and Image Processing Method According to Second Embodiment According to the image processing system according to the second embodiment, the following effects can be obtained.

[1] The self-printing terminal apparatus 110 generates the composite image based on the image uploaded from the first smartphone 106A or the like. The self-printing terminal apparatus 110 may print the composite image using the printing unit 138. Accordingly, kanji in the composite image can be conveniently enjoyed using the printed material.

[2] The self-printing terminal apparatus 110 may download the composite image generated using the server apparatus 102 and print the downloaded composite image based on the image uploaded to the server apparatus 102 from the first smartphone 106A or the like. Accordingly, kanji in the composite image can be conveniently enjoyed using the printed material.

[3] The self-printing terminal apparatus 110 may transmit the image which is uploaded to the self-printing terminal apparatus 110 from the first smartphone 106A or the like, to the server apparatus 102, download the composite image generated using the server apparatus 102, and print the downloaded composite image. Accordingly, kanji in the composite image can be conveniently enjoyed using the printed material.

Configuration Example of User Interface

Figure 10:
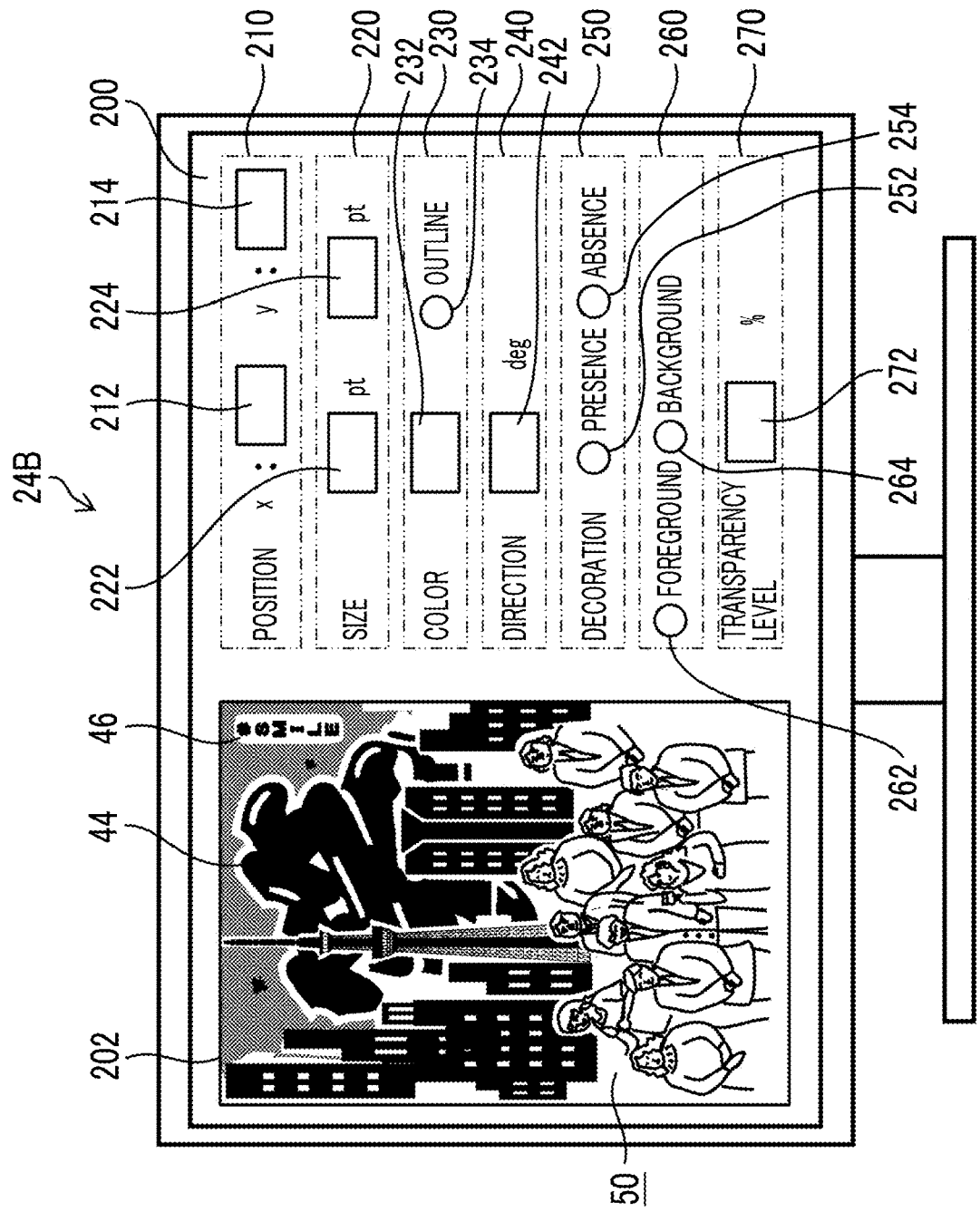
FIG. 10 is a screen diagram illustrating one example of a layout setting screen.

Next, a configuration example of the user interface will be described. FIG. 10 is a screen diagram illustrating one example of a layout setting screen. A layout setting screen 200 illustrated in FIG. 10 is displayed on a display unit 24B or the like in a case where the layout is manually set. A liquid crystal monitor apparatus that is connected to the computer will be illustrated as an example of the display unit 24B.

The operator visually recognizes the layout setting screen 200 and may set the layout of the composite image by operating an operation member such as a keyboard and a mouse, not illustrated. The term setting may include a concept of correction.

The layout setting screen 200 includes a composite image display region 202. The image 50 of the processing target, the kanji string 44, and the hashtag 46 are displayed in the composite image display region 202.

The layout setting screen 200 includes a position setting region 210. The position setting region 210 includes an x coordinate value box 212 in which an x coordinate value is displayed, and a y coordinate value box 214 in which a y coordinate value is displayed.

The layout setting screen 200 includes a size setting region 220. The size setting region 220 includes a kanji point box 222 in which a point number of the kanji string 44 is displayed, and a hashtag point box 224 in which a point number of the hashtag 46 is displayed.

The layout setting screen 200 includes a color setting region 230. The color setting region 230 includes a color display box 232 that displays color, and an outline button 234 that represents whether or not to apply the outline character. The color display box 232 may display color or display a character string representing the color. In a case where the outline button 234 is checked, the color display box 232 displays the background color of the outline character.

The layout setting screen 200 includes a direction setting region 240. The direction setting region 240 includes an angle box 242 in which a value of an angle with respect to the reference direction is displayed. A reference angle of the angle with respect to the reference direction may be 0 degrees with a clockwise direction as a positive direction and a counterclockwise direction as a negative direction.

The layout setting screen 200 includes a decoration setting region 250 in which presence or absence of decoration is set. The decoration setting region 250 includes a presence button 252 that is selected in a case where decoration is performed, and an absence button 254 that is selected in a case where decoration is not performed.

The layout setting screen 200 includes a foreground setting region 260 in which the kanji string 44 and the hashtag 46 are set as a foreground or a background. The foreground setting region 260 includes a foreground selection button 262 that is selected in a case where the kanji string 44 and the hashtag 46 are set as a foreground, and a background selection button 264 that is selected in a case where the kanji string 44 and the hashtag 46 are set as a background. The layout setting screen 200 illustrated in FIG. 10 represents a state where a case of setting the object 42 as a foreground and setting the kanji string 44 as a background is selected.

The layout setting screen 200 includes a transparency level setting region 270 in which the transparency levels of the kanji string 44 and the hashtag 46 in a case where the kanji string 44 and the hashtag 46 are set as a foreground are set. The transparency level setting region 270 includes a transparency level box 272 in which a value of the transparency level is displayed.

An aspect in which a numerical value or the like is input, or an aspect in which a pull-down menu is displayed may be applied to the x coordinate value box 212 and the like. The layout setting screen 200 may display initial setting of composition parameters.

On the layout setting screen 200 illustrated in FIG. 10, changes such as reduction of functions can be made in correspondence with the display included in the smartphone 10A or the like illustrated in FIG. 2. In addition, it may be configured that a page is created for each setting item, and each setting can be performed while scrolling the plurality of pages.

Specific Example of Composite Image

First Specific Example

Figure 11:
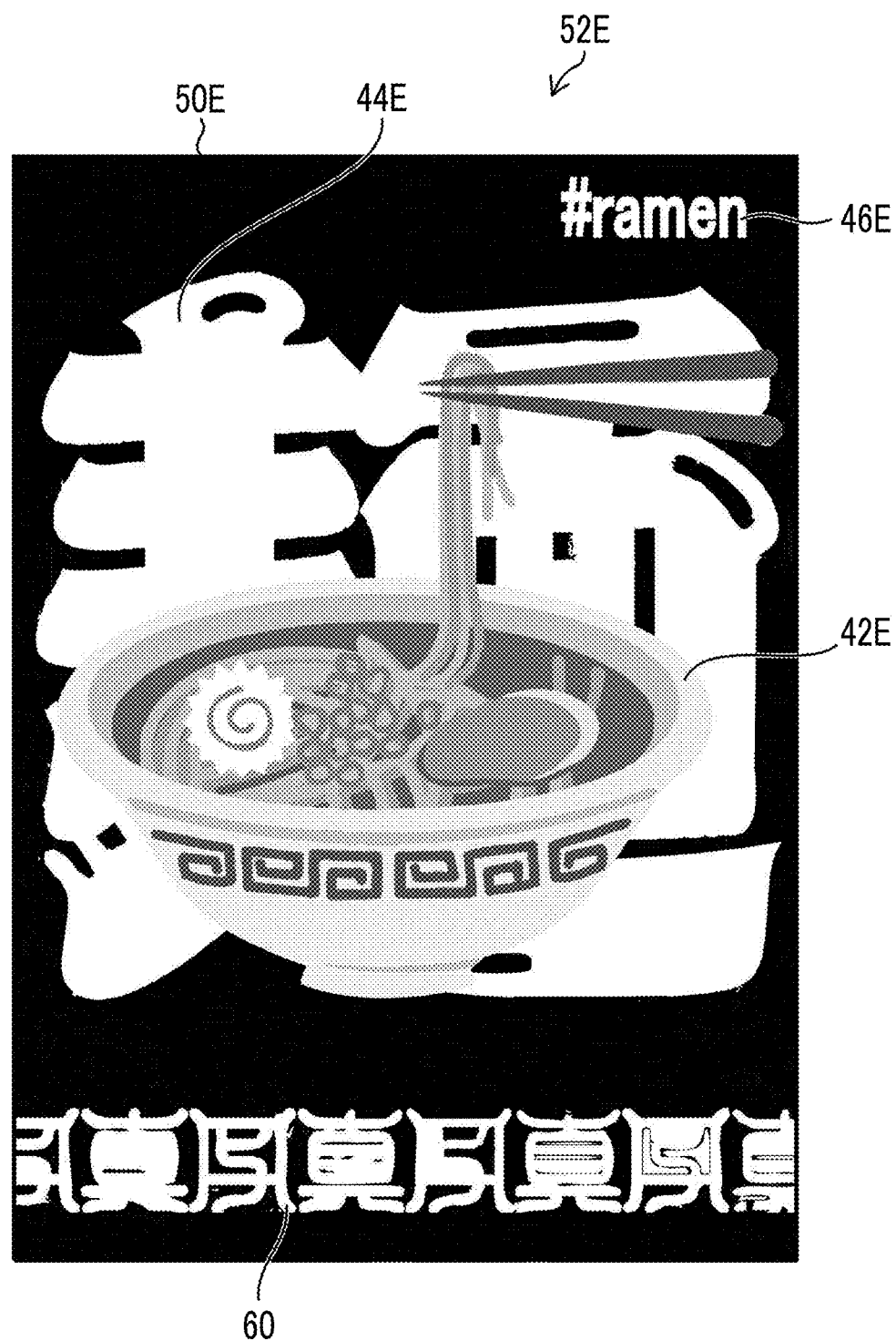
FIG. 11 is a descriptive diagram of a composite image according to a first specific example.

FIG. 11 is a descriptive diagram of a composite image according to a first specific example. An image 50E in which ramen is captured is applied to a composite image 52E illustrated in FIG. 11. In the composite image 52E, noodle that is related to the ramen extracted as an object 42E is composited as a kanji string 44E with the image 50E.

In addition, in the composite image 52E, #ramen that is related to a meaning of the kanji string 44E of noodle is composited as a hashtag 46E with the image 50E. Furthermore, in the composite image 52E, a third FIG. 60 that resembles kanji of photograph is composited with the image 50E on a lower edge of the composite image 52E. The third FIG. 60 resembles a style of a figure represented on an outer periphery surface of a ramen bowl of the object 42E.

The outline character is applied to the kanji string 44E. A transparent outline character is also applied to the hashtag 46E and the third FIG. 60. A background of the kanji string 44E or the like may be filled with any color or a net of any color. In the present specification, the term transparency may include a concept of semi-transparency.

In the composite image 52E, a background of the image 50E is seen in the kanji string 44E to which a relatively bold outline character is applied. In addition, in the composite image 52E, the object 42E is securely shown through the kanji string 44E.

Furthermore, in the composite image 52E, contours of at least a part of the object 42E are cut and arranged outside contours of the kanji string 44E. Furthermore, a background of the kanji string 44E is semi-transparent, and the background of the image 50E is slightly seen.

In the composite image 52E according to the first specific example, the kanji string 44E related to the object 42E can be enjoyed without affecting an atmosphere of the image 50E.

Second Specific Example

Figure 12:
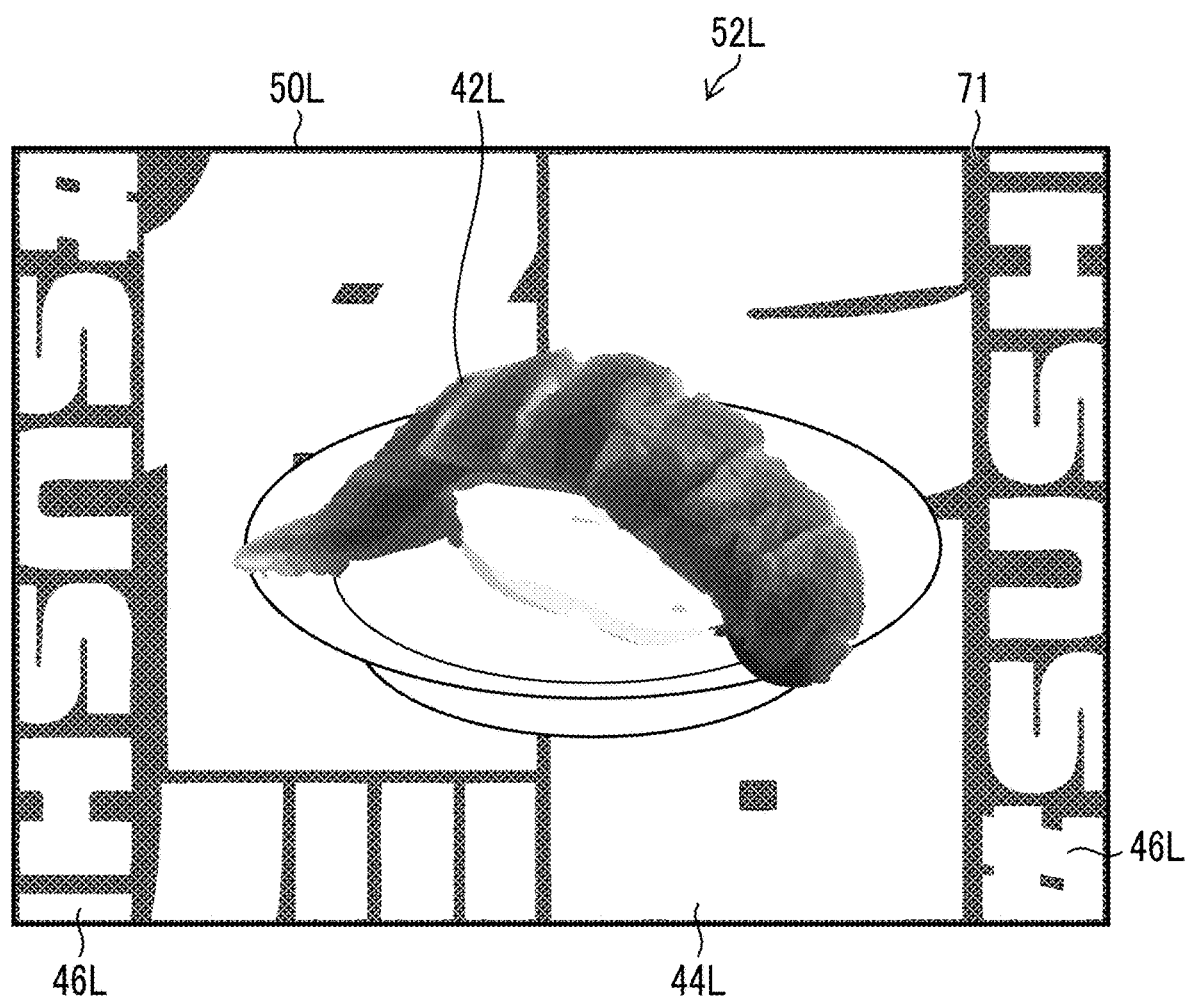
FIG. 12 is a descriptive diagram of a composite image according to a second specific example.

FIG. 12 is a descriptive diagram of a composite image according to a second specific example. An image 50L in which nigiri served in a dish is captured is applied to a composite image 52L illustrated in FIG. 12. In the composite image 52L, a word of sushi that is related to the nigiri extracted as an object 42L is composited as a kanji string 44L with the image 50L. In addition, in the composite image 52L, #SUSHI that is related to a meaning of the kanji string 44L of sushi is composited as a hashtag 46L with the image 50L.

The outline character is applied to the kanji string 44L. A color that is used in the object 42L is applied to a background 71 of the outline character. In addition, in the composite image 52L, two hashtags 46L are applied to one kanji string 44L. In the composite image 52L, a center of the kanji string 44L is arranged at a center position of the composite image 52L, and the two hashtags 46L are arranged in a left-right symmetry about the kanji string 44L. The two hashtags 46L are set in directions opposite to each other.

In the composite image 52L according to the second specific example, a design that has unity of color as a whole and prioritizes symmetry is employed. Capital characters may be applied to alphabets applied to the hashtag 46L. Only the initial of the alphabets applied to the hashtag 46L may be a capital character. A plurality of hashtags 46L may be composited with one kanji string 44L.

Third Specific Example

Figure 13:
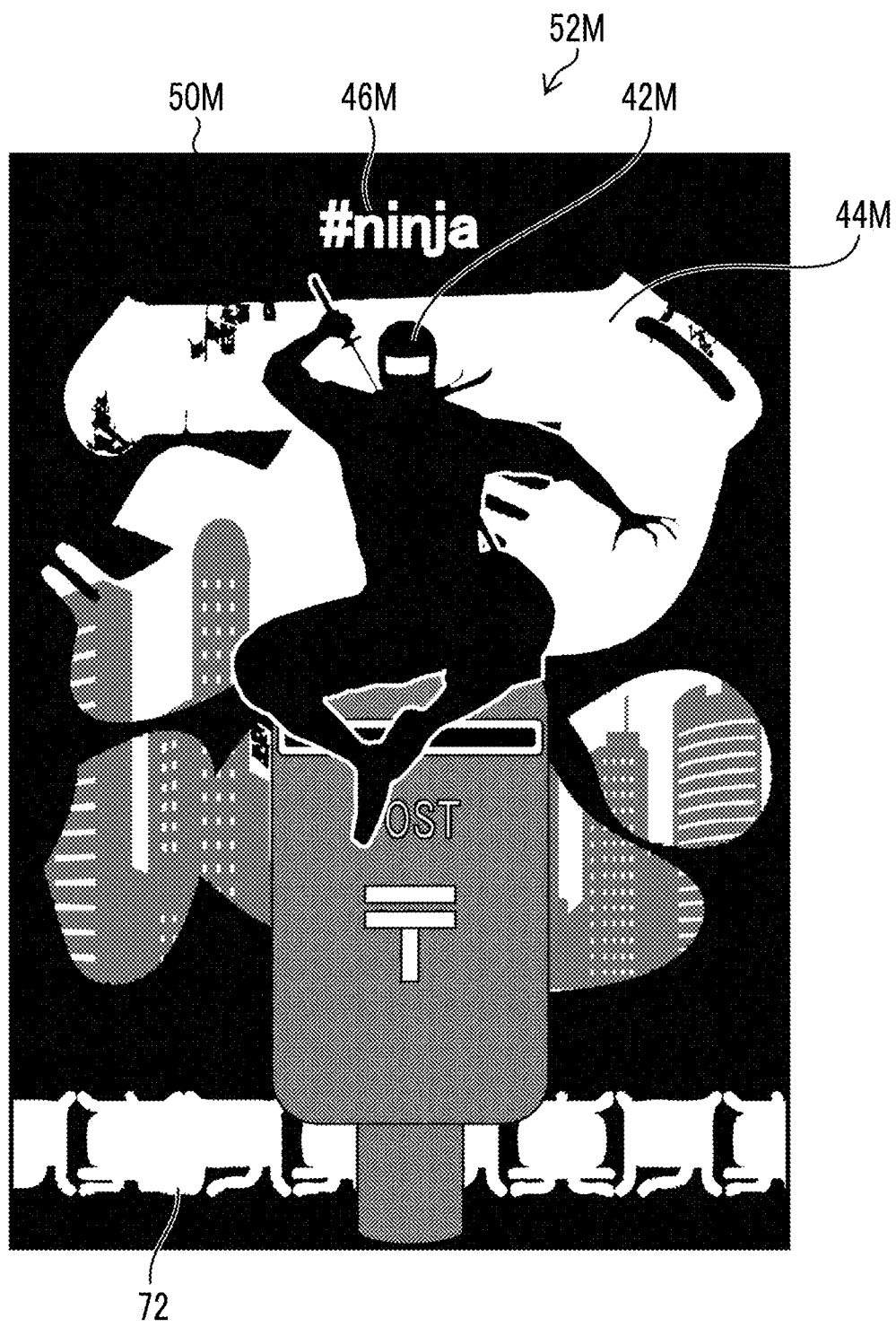
FIG. 13 is a descriptive diagram of a composite image according to a third specific example.

FIG. 13 is a descriptive diagram of a composite image according to a third specific example. An image 50M that is obtained by compositing an image in which a person sits on a postbox with an image in which a daytime scene of a downtown street is captured is applied to a composite image 52M illustrated in FIG. 13. In the composite image 52M, a word of ninja that is related to the person extracted as an object 42M is composited as a kanji string 44M with the image 50M. In addition, in the composite image 52M, #ninja that is related to a meaning of the kanji string 44M of ninja is composited as a hashtag 46M with the image 50M.

In the composite image 52M, a fourth FIG. 72 that is the same as the third FIG. 60 illustrated in FIG. 11 is composited with the image 50M on a lower edge of the composite image 52M.

In the composite image 52M, the person sitting on the postbox constituting the image 50M is the foremost plane of the kanji string 44M, and the scene of the daytime downtown stress constituting the image 50M is the rearmost plane in the composite image 52M.

In the composite image 52M according to the third specific example, an image in which two images are composited is applied as the image 50M. One of the two images is the foremost plane, and the other is the rearmost plane. By doing so, kanji can be enjoyed by compositing various images.

Fourth Specific Example

Figure 14:
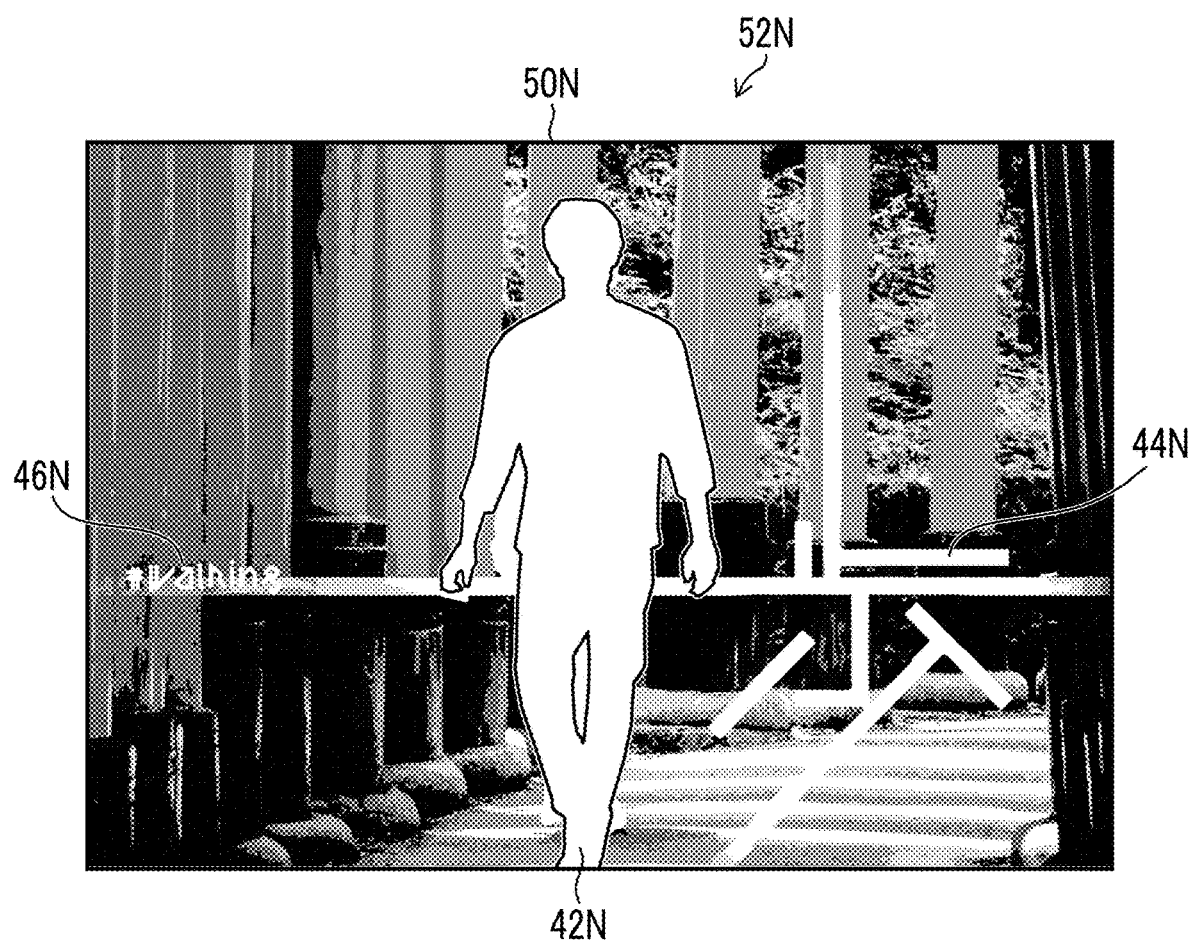
FIG. 14 is a descriptive diagram of a composite image according to a fourth specific example.

FIG. 14 is a descriptive diagram of a composite image according to a fourth specific example. An image 50N in which a person walking on a sando is captured is applied to a composite image 52N illustrated in FIG. 14. In the composite image 52N, a word of walking that is related to the person who is walking on the sando and is extracted as an object 42N is composited as a kanji string 44N with the image 50N. In addition, in the composite image 52N, #walking that is related to a meaning of the kanji string 44N of walking is composited as a hashtag 46N with the image 50N.

In the composite image 52N, the kanji string 44N is deformed in accordance with a space, and arrangement of the kanji string 44N that is spatially in harmony is implemented. The kanji string 44N is deformed in accordance with a shape of the sando in the image 50N.

In the composite image 52N according to the fourth specific example, the deformation and the arrangement of the kanji string 44N that is spatially in harmony are applied, and excellent design quality is obtained.

Fifth Specific Example

Figure 15:
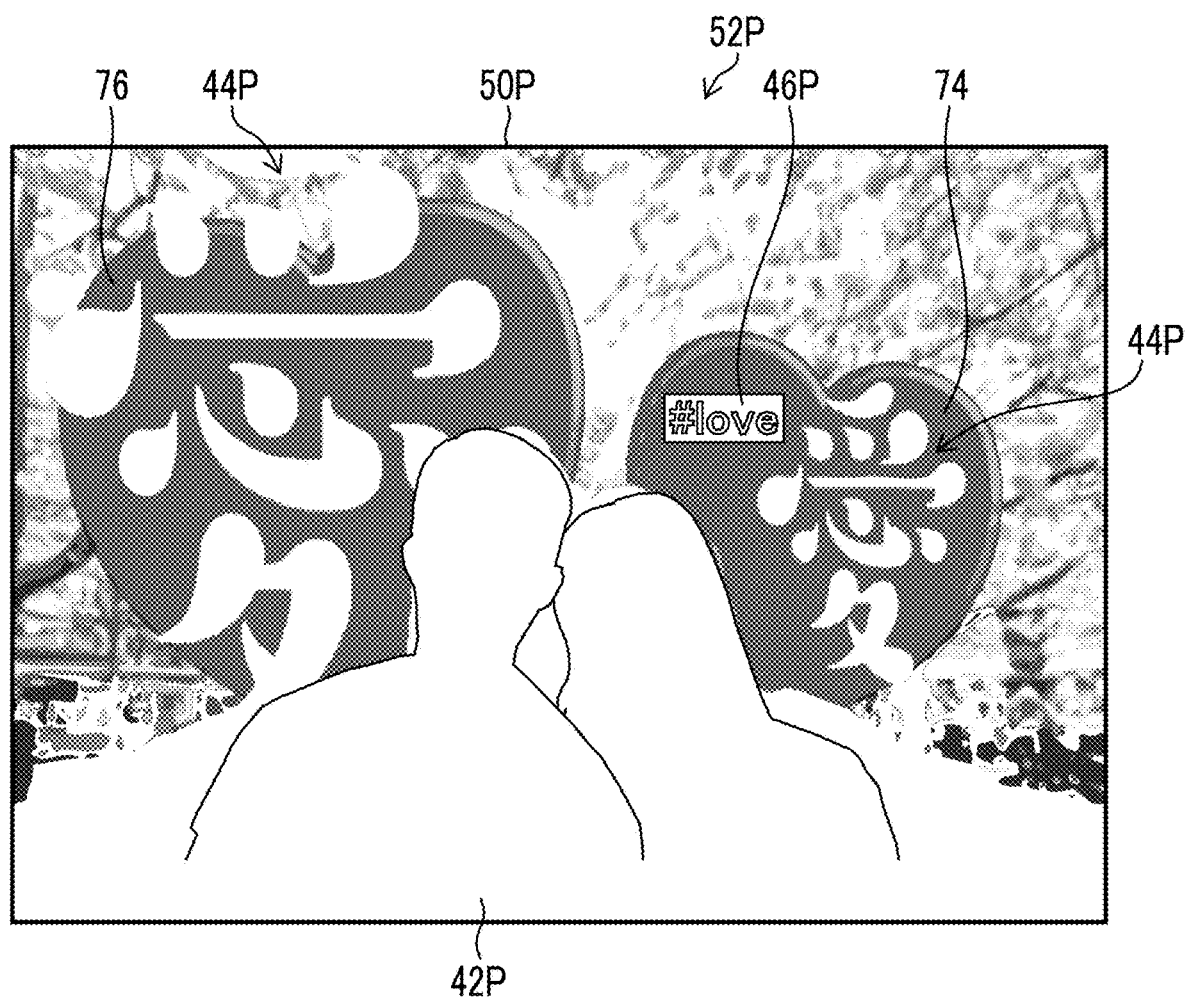
FIG. 15 is a descriptive diagram of a composite image according to a fifth specific example.

FIG. 15 is a descriptive diagram of a composite image according to a fifth specific example. An image 50P in which a couple is captured is applied to a composite image 52P illustrated in FIG. 15. In the composite image 52P, a word of love that is related to the couple extracted as an object 42P is composited as a kanji string 44P with the image 50P. In addition, in the composite image 52P, #love that is related to a meaning of the kanji string 44P of love is composited as a hashtag 46P with the image 50P.

In the composite image 52P, one kanji string 44P is arranged at a position of a shoulder of each of two persons away from faces of the object 42P. A fifth FIG. 74 is composited with a background of one of two kanji strings 44P, and a sixth FIG. 76 is composited with a background of the other. The hashtag 46P is arranged at only a position in superimposition with the fifth FIG. 74 in one of the two kanji strings 44P.

In the composite image 52P according to the fifth specific example, a plurality of kanji strings 44P are arranged away from the faces of the object 42P. Accordingly, integrity between the object 42P and the kanji strings 44P is repre-sented. In addition, the fifth FIG. 74 and the sixth FIG. 76 are superimposed on the kanji strings 44P. Accordingly, the kanji strings 44P having excellent design quality can be applied.

Application Example for Program Causing Computer to Function as Image Processing System The image processing method and the image processing system described above can be configured as a program that implements a function corresponding to each step in the image processing method or each step in the image processing system using a computer.

For example, a program that implements an image analysis function of analyzing the acquired image 50 and extracting the object 42, a kanji string decision function of deciding a kanji string related to the object, a layout decision function of deciding a layout of a composite image, and a composition function of generating the composite image based on the layout may be configured.

The program that causes the computer to implement an image processing function described above can be stored in a computer-readable information storage medium that is a non-transitory information storage medium and is a tangible object, and the program can be provided through the information storage medium.

In addition, an aspect in which a program signal is provided through a communication network can be available instead of an aspect in which the program is stored in the non-transitory information storage medium.

Combination of Embodiment, Modification Example, and Like

Constituents described in the embodiments and constituents described in the modification example can be appropriately used in combination. In addition, a part of the constituents may be replaced.

In the embodiments of the present invention described thus far, constituents can be appropriately changed, added, or removed without departing from a gist of the present invention. The present invention is not limited to the embodiments described thus far and can be subjected to various modifications within a technical idea of the present invention by those having ordinary knowledge in the field.

EXPLANATION OF REFERENCES

10: image processing system
10A: smartphone
12: image acquisition unit
13: image storage unit
14: object extraction unit
15: object attribute information storage unit
16: kanji inquiry unit
18: layout decision unit
20: composition unit
22: kanji template database
24: display unit
24A: liquid crystal display
26: composite image storage unit
30: imaging apparatus
40: character size decision unit
42: object
42E: object
42L: object
42M: object 42N: object
42P: object
44: kanji string
44E: kanji string
44L: kanji string
44M: kanji string
44N: kanji string
44P: kanji string
46: hashtag
46E: hashtag
46L: hashtag
46M: hashtag
46N: hashtag
46P: hashtag
48: kanji template
50: image
50E: image
50L: image
50M: image
50N: image
50P: image
52: composite image
52E: composite image
52L: composite image
52M: composite image
52N: composite image
52P: composite image
59: scene
60: third figure
71: background
72: fourth figure
74: fifth figure
76: sixth figure
100: image processing system
102: server apparatus
104: network
106A: first smartphone
106B: second smartphone
108: laptop type personal computer
110: self-printing terminal apparatus
120: image acquisition unit
122: image storage unit
124: object extraction unit
126: object attribute information storage unit
128: kanji inquiry unit
130: layout decision unit
132: composition unit
134: kanji template database
136: display unit
138: printing unit
140: character size decision unit
142: character color decision unit
144: character position decision unit
146: character direction decision unit
148: character decoration decision unit
150: foreground decision unit
152: transparency decision unit
154: layout correction unit
200: layout setting screen
202: composite image display region
210: position setting region
212: x coordinate value box
214: y coordinate value box
220: size setting region
222: kanji point box
224: hashtag point box
230: color setting region
232: color display box
234: outline button
240: direction setting region
242: angle box
250: decoration setting region
252: presence button
254: absence button
260: foreground setting region
262: foreground selection button
264: background selection button
270: transparency level setting region
272: transparency level box
S10 to S28, S100 to S116, S200 to S220: each step of image processing method

What is claimed is:

1. An image processing method comprising:
an image analysis step of analyzing an image and extracting an object from the image;
a kanji string decision step of deciding a kanji string that includes one or more kanji characters related to the object;
a layout decision step of deciding a layout in which the kanji string is composited with the image as a decided layout;
a composition step of generating a composite image by compositing the kanji string with the image based on the decided layout; and
an alphabet character string decision step of deciding an alphabet character string related to a meaning of the kanji string,
wherein in the layout decision step, a layout in which the object is set as a foreground of the composite image and the kanji string is set as a background of the composite image is decided as the decided layout,
in the layout decision step, a layout in which the alphabet character string is composited with the image is decided as the decided layout, and
the background is at least partially covered by the foreground.

2. The image processing method according to claim 1, wherein in the layout decision step, a layout in which an outline character is applied to the kanji string is decided as the decided layout.

3. The image processing method according to claim 2, wherein in the layout decision step, a layout in which semi-transparency is applied to a background of the outline character is decided as the decided layout.

4. The image processing method according to claim 2, wherein in the layout decision step, a layout in which at least a part of a non-object excluding the object in the image is seen through the kanji string to which the outline character is applied is decided as the decided layout.

5. The image processing method according to claim 2, wherein in the layout decision step, a layout in which a part of the object is superimposed on a background of the outline character is decided.

6. The image processing method according to claim 1, wherein in the layout decision step, a layout in which the kanji string is arranged away from a subject of the image is decided as the decided layout.

7. The image processing method according to claim 1, wherein in the layout decision step, a layout in which the kanji string is superimposed on a subject of the image is decided as the decided layout.

8. The image processing method according to claim 1, further comprising:

a printing step of printing the composite image using a printer.

9. The image processing method according to claim 1, wherein in the layout decision step, a layout in which an outline character is applied to the alphabet character string is decided as the decided layout.

10. The image processing method according to claim 9, wherein in the layout decision step, a layout in which semi-transparency is applied to a background of the outline character is decided as the decided layout.

11. The image processing method according to claim 9, wherein in the layout decision step, a layout in which at least a part of a non-object excluding the object in the image is seen through the alphabet character string to which the outline character is applied is decided as the decided layout.

12. A non-transitory, computer-readable recording medium which records a program causing a computer to implement:
an image analysis function of analyzing an image and extracting an object from the image;
a kanji string decision function of deciding a kanji string that includes one or more kanji characters related to the object;
a layout decision function of deciding a layout in which the kanji string is composited with the image;
a composition function of generating a composite image by compositing the kanji string with the image based on the layout, and
an alphabet character string decision function of deciding an alphabet character string related to a meaning of the kanji string,
wherein the layout decision function decides a layout in which the object is set as a foreground of the composite image and the kanji string is set as a background of the composite image,
the layout decision step decides a layout in which the alphabet character string is composited with the image is decided as the decided layout, and
the background is at least partially covered by the foreground.

13. An image processing system including at least one processor,
wherein the at least one processor is configured to:
analyze an image and extracts an object from the image;
decide a kanji string which includes one or more kanji characters related to the object;
decide a layout in which the kanji string is composited with the image;
generate a composite image by compositing the kanji string with the image based on the layout; and
decide an alphabet character string related to a meaning of the kanji string, and
wherein, in the layout, the object is set as a foreground of the composite image and the kanji string is set as a background of the composite image,
in the layout, the alphabet character string is composited with the image, and
the background is at least partially covered by the foreground.

14. The image processing system according to claim 13, wherein the at least one processor is configured to cause a printer to print the composite image.

15. The image processing system according to claim 13, the image processing system connected through a network.

16. The image processing system according to claim 13, further comprising a printer that is connected through a network,
wherein the printer is configured to print the composite image.

17. The image processing system according to claim 16, wherein the printer includes the at least one processor and is configured to print the composite image based on the image.

18. The image processing system according to claim 13, further comprising
a server apparatus that is connected through the network,
wherein the server apparatus includes the at least one processor.

19. An image processing method comprising:
an image analysis step of analyzing an image and extracting an object from the image;
a kanji string decision step of deciding a kanji string that includes one or more kanji characters related to the object;
a layout decision step of deciding a layout in which the kanji string is composited with the image as a decided layout; and
a composition step of generating a composite image by compositing the kanji string with the image based on the decided layout,
wherein in the layout decision step, a layout in which the object is set as a foreground of the composite image and the kanji string is set as a background of the composite image is decided as the decided layout,
a user selects whether the kanji string and an alphabet character string related to a meaning of the kanji string are set in the background or the foreground, and
the background is at least partially covered by the foreground.

20. A non-transitory, computer-readable recording medium which records a program causing a computer to implement:
an image analysis function of analyzing an image and extracting an object from the image;
a kanji string decision function of deciding a kanji string that includes one or more kanji characters related to the object;
a layout decision function of deciding a layout in which the kanji string is composited with the image; and
a composition function of generating a composite image by compositing the kanji string with the image based on the layout,
wherein the layout decision function decides a layout in which the object is set as a foreground of the composite image and the kanji string is set as a background of the composite image,
a user selects whether the kanji string and an alphabet character string related to a meaning of the kanji string are set in the background or the foreground, and
the background is at least partially covered by the foreground.

21. An image processing system including at least one processor,
wherein the at least one processor is configured to:
analyze an image and extracts an object from the image;
decide a kanji string which includes one or more kanji characters related to the object;
decide a layout in which the kanji string is composited with the image; and
generate a composite image by compositing the kanji string with the image based on the layout, and wherein, in the layout, the object is set as a foreground of the composite image and the kanji string is set as a background of the composite image, a user selects whether the kanji string and an alphabet character string related to a meaning of the kanji string are set in the background or the foreground, and the background is at least partially covered by the foreground.

* * * * *